United States Patent
Dykes et al.

(10) Patent No.: US 11,652,812 B2
(45) Date of Patent: *May 16, 2023

(54) NETWORK SECURITY DYNAMIC ACCESS CONTROL AND POLICY

(71) Applicant: ArecaBay, Inc., San Mateo, CA (US)

(72) Inventors: Robert Dykes, Los Altos Hills, CA (US); Lebin Cheng, Saratoga, CA (US); Ravindra K. Balupari, San Jose, CA (US)

(73) Assignee: ARECABAY, INC., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/349,913

(22) Filed: Jun. 17, 2021

(65) Prior Publication Data

US 2021/0367935 A1 Nov. 25, 2021

Related U.S. Application Data

(63) Continuation of application No. 16/375,686, filed on Apr. 4, 2019, now Pat. No. 11,070,539.

(60) Provisional application No. 62/655,577, filed on Apr. 10, 2018.

(51) Int. Cl.
*G06F 21/00* (2013.01)
*H04L 9/40* (2022.01)

(52) U.S. Cl.
CPC .......... *H04L 63/0807* (2013.01); *H04L 63/10* (2013.01); *H04L 63/20* (2013.01)

(58) Field of Classification Search
CPC ..... H04L 63/0807; H04L 63/10; H04L 63/20; H04L 63/0209; H04L 63/108; H04L 63/105

See application file for complete search history.

(56) References Cited

U.S. PATENT DOCUMENTS

| | | | |
|---|---|---|---|
| 9,479,492 B1* | 10/2016 | Roth | H04L 63/08 |
| 2002/0049912 A1* | 4/2002 | Honjo | H04L 63/20 726/10 |
| 2004/0243834 A1* | 12/2004 | Stefik | H04L 9/3297 375/E7.009 |
| 2009/0222903 A1* | 9/2009 | Sherkin | G06F 21/6218 726/10 |

(Continued)

*Primary Examiner* — Ghazal B Shehni
(74) *Attorney, Agent, or Firm* — Womble Bond Dickinson (US) LLP

(57) ABSTRACT

A network security system and method implements dynamic access control for a protected resource using run-time contextual information. In some embodiments, the network security system and method implements a dynamic access ticket scheme for access control where the access ticket is based on run-time application context. In other embodiments, the network security system and method implements policy enforcement actions in response to detected violations using application programming interface (API) to effectively block detected policy violations without negatively impacting the operation of the application or the user of the application. In some embodiments, the network security system uses enterprise social collaboration tools to interact with the end-user or with the system administrator in the event of detected security incidents.

16 Claims, 16 Drawing Sheets

(56) References Cited

U.S. PATENT DOCUMENTS

| | | | | |
|---|---|---|---|---|
| 2010/0023582 A1* | 1/2010 | Pedersen | ............... | H04L 67/34 |
| | | | | 709/203 |
| 2010/0100924 A1* | 4/2010 | Hinton | ............... | G06F 21/10 |
| | | | | 726/1 |
| 2015/0244735 A1* | 8/2015 | Kumar | ............... | G06F 21/51 |
| | | | | 726/23 |
| 2017/0244730 A1* | 8/2017 | Sancheti | ............... | H04L 63/20 |

* cited by examiner

Access Control 5: Double Injection of Access Ticket

API Action 2: Active Client Notification

NETWORK SECURITY DYNAMIC ACCESS CONTROL AND POLICY

CROSS REFERENCE TO RELATED APPLICATIONS

The present application is a Continuation of U.S. patent application Ser. No. 16/375,686, entitled "Network Security Dynamic Access Control And Policy," filed on Apr. 4, 2019, the entire contents of which are incorporated herein by reference. U.S. patent application Ser. No. 16/375,686 claims the benefit under 35 U.S.C. § 119(e) of U.S. Provisional Patent Application Ser. No. 62/655,577, entitled "Methods Of Using Runtime Application Context Information And API For Dynamic Access Control And Policy Enforcement Actions," filed Apr. 10, 2018, the entire contents of which are incorporated herein by reference.

FIELD OF THE INVENTION

This present inventive concept relates to network security, and more particularly to providing dynamic access control using run-time contextual information and/or implementing policy enforcement actions using application programming interface (API).

BACKGROUND OF THE INVENTION

Private individuals and businesses increasingly rely on network interconnectivity to conduct their business and transfer more and more data over the Internet. In particular, enterprises are increasingly providing application programming interface (API) access to their applications (commonly referred to as an "App") driven by a need to support user mobility and a need for the adoption of Cloud and Internet of Things (IoT). Enabling API access to enterprise applications exposes the enterprise to a new set of security risks at the API level. In addition, new generations of enterprise applications are increasingly being built with an architecture that features microservices, continuous deployment, and pervasive encryption. Such architecture leaves most conventional security solutions opaque to threats and attacks.

Access control and policy enforcement are two of the most important features of security tools, but the conventional security tools are lacking as enterprise applications evolve.

There is a wide variety of access control mechanisms but they commonly rely on using some static piece of information such as tokens (e.g. the OAuth token or a signed SAML assertion) to which the receiver is granted access. When granting access, sometimes contextual information such as the security posture of the endpoint may be evaluated in addition to static tokens but that contextual information is still derived from fixed attributes, such as the device/user/end-point location. Further complicating the situation, in a typical "zero trust" environment such as the public cloud, neither the client application instance platform nor the service side can be trusted to be safe.

FIG. 1 illustrates an environment in which an enterprise application may be deployed in some examples. Referring to FIG. 1, in a network environment 10, an enterprise application includes a client application executed on a user device and a service application executed on a back-end server. The back-end server front-ends a protected resource 18 which may include one or more databases 20 storing data that are to be retrieved by or provided to one or more users. A user uses the client application to interact with the service application to gain access to the protected resource 18. A conventional access control layer 16 is often used to regulate access to the protected resource. Conventional access control layer 16 may implement access control based on a key or a static access token, granting access to any request that presents a valid key or a valid access token.

In the example shown in FIG. 1, both the client application and the service application are operating in a zero trust environment, such as the public cloud. For example, an instance of the client application may be executed in a zero trust zone 12, which communicates with an instance of the service application that is also executed in a zero trust zone 14. In this environment, bad actors, such as bad actor 27, can attempt to access the service application instance posing as a client. For example, the bad actor 27 may provide the service application with a compromised end-user credential. If a bad actor can compromise the service application instance platform, the bad actor can also potentially initiate access to the back-end protected resources 18 from the same platform on which the service application instance is run.

Existing solutions may be able to authenticate a user using the client application instance, but they cannot protect the service application instance if the authentication credentials themselves are compromised. Likewise, bad actors with access to the service application platform, for example, root access, may have all the static tokens and/or credentials needed by the service application instance to access protected resources. Static tokens or static information (e.g. server's IP address) will not be able to protect against such bad actors.

Even when a policy violation can be detected, current methods to stop a potential bad actor access are to block the connection or invalidate the credential for future access. Both of these methods, while effective against a bad actor, can negatively impact application performance. For example, if a user inadvertently violates a policy accessing a protected resource, a simple drop of the connection will effectively stop the access but doing so likely results in the client application instance retrying continuously, as the user may confuse the connection drop with a network outage. Invalidating a credential can be a undesirable remedy as it may end up denying access to a legitimate user upon a single policy violation.

BRIEF DESCRIPTION OF THE DRAWINGS

Various embodiments of the invention are disclosed in the following detailed description and the accompanying drawings.

DETAILED DESCRIPTION

Figure 1:
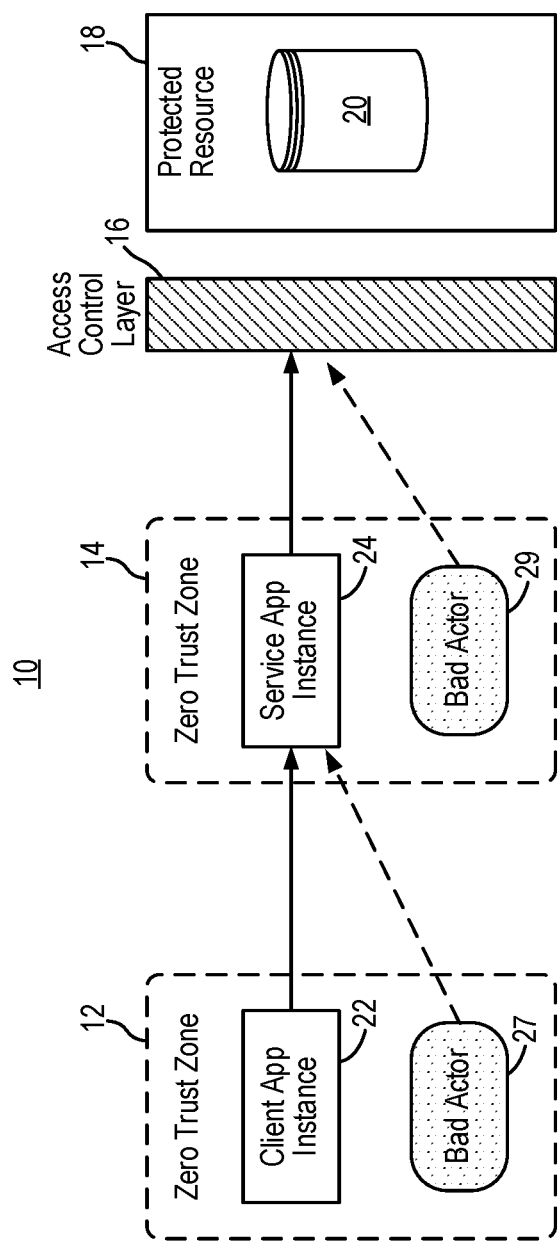
FIG. 1 illustrates an environment in which an enterprise application may be deployed in some examples.

In embodiments of the present invention, a network security system and method implements dynamic access control for a protected resource using run-time contextual information. In some embodiments, the network security system and method implements a dynamic access ticket scheme for access control where the access ticket is based on run-time application context. In this manner, access control to protected resource can be significantly improved. Furthermore, in other embodiments, the network security system and method implements policy enforcement actions in response to detected violations using application programming interface (API). In some embodiments, the network security system and method implements policy enforcement actions using API to effectively block detected policy violations without negatively impacting the operation of the application or the user of the application.

More specifically, the network security system and method of the present invention leverages information available only during the run-time of an enterprise application to improve access control and to enhance policy actions. For access control purpose, even within the zero trust zone where no static information can be assumed safe from bad actors, it is much harder for a bad actor to gain continuous access to and subsequently spoof run-time application information. Even if a bad actor can get temporary access to the run-time application information, it is hard for such bad actor to continue to do so without being detected by common security controls.

In embodiments of the present invention, the network security system and method uses dynamic access tickets that are generated using run-time application context. When the dynamic access tickets are used in combination with static tokens, access control to protected resource can be significantly improved. Even if a bad actor gains access to the service zero trust zone, the only theoretical access the bad actor gains would be temporary access within the window when the bad actor has access to the runtime information. Even in that situation, the network security system and method of the present invention can mitigate the security breach by the use of single-use tickets or limited-use tickets in embodiments of the present invention.

In embodiments of the present invention, a network security system implements policy enforcement which leverages the API of the enterprise application to remediate policy violations when policy violations are detected. For instance, the API of an enterprise application is leveraged during run-time to block policy violation with no negative impact to the application itself or other consumers/users of the application. In some embodiments, the run-time transaction information between a client and server interaction is obtained and the same API used between the client application and service application is used to terminate an application-level action that is determined to be in violation of policy. Such action is taken at run-time, as if the application itself had taken the action. In other embodiments, the network security system uses enterprise social collaboration tools to interact with the user or with the system administrator in the event of detected security incidents.

In the present description, an application programming interface (API) refers to a software architecture element that facilitates interaction between software applications or distinct computer systems. In general, an API includes two elements: a specification that describes the possible interactions between software applications or between distinct computer systems and a software interface that publishes the specification. The specification of the API describes how information can be exchanged between applications, such as the request for processing and data delivery protocols. An API can include a set of protocols, routines, functions and/or commands to facilitate communication between software applications or distinct computer systems.

Furthermore, in the present description, an enterprise application (sometimes referred to as an "App") includes software components that communicate over a data network and data input/output and instructions to perform a specific business function. In some examples, an enterprise application may include a client application (or "client app) provided on the user device and a service application (or "service app") provided on a server in communication with client application to perform related functions. For example, the service application may interact with the client application to provide the client application with data from a protected resource.

Network Security System and Method Using Access Tickets

Figure 2:
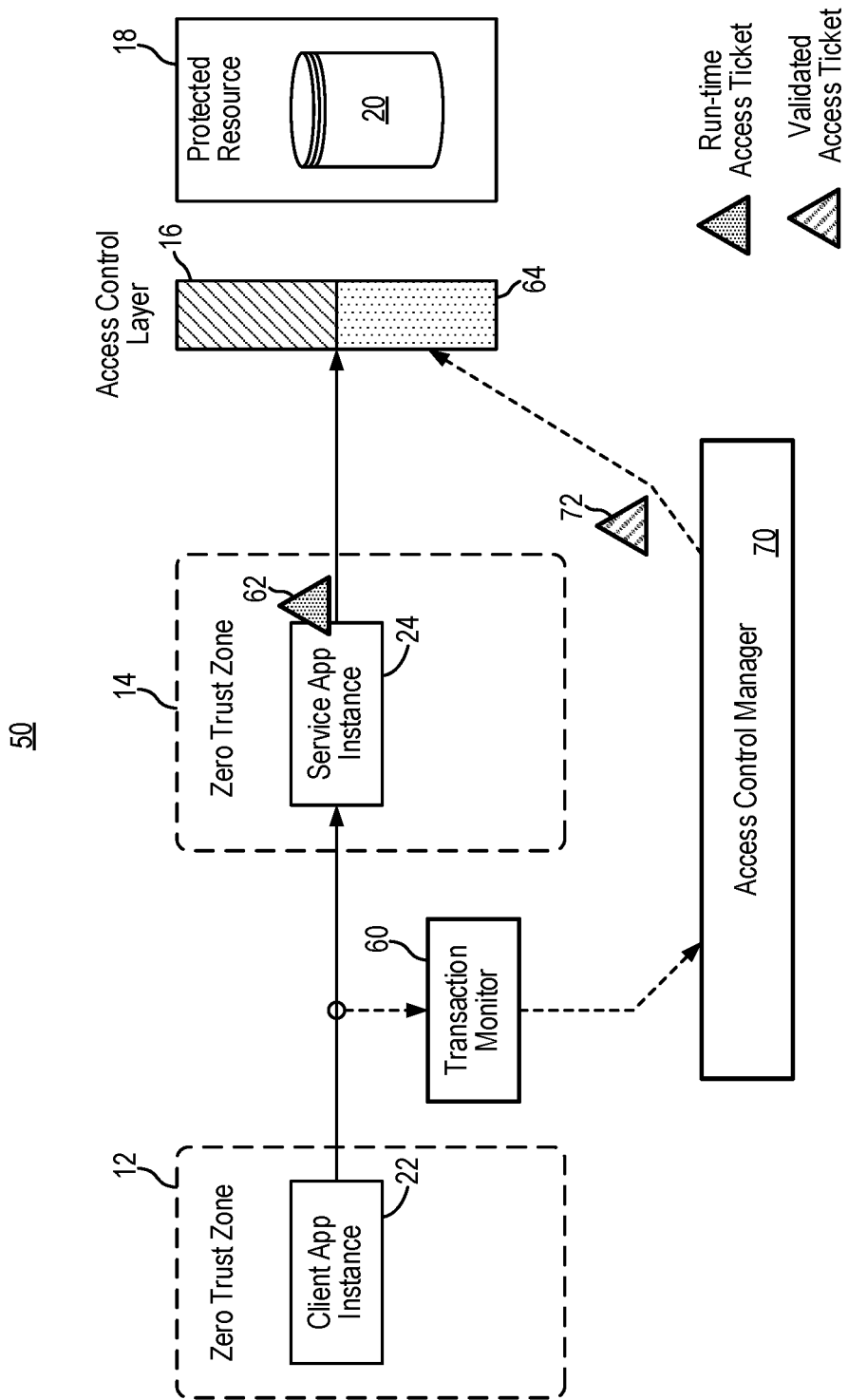
FIG. 2 illustrates an environment in which a network security system is implemented in embodiments of the present invention.

FIG. 2 illustrates an environment in which a network security system is implemented in embodiments of the present invention. Referring to FIG. 2, in a network environment 50, an enterprise application includes a client application executed on a user device and a service application executed on a back-end server. The back-end server front-ends a protected resource 18 which may include one or more databases 20 storing data that are to be retrieved by or provided to one or more users. The client application, executed on a user device, interacts with the service application, executed on the back-end server, to gain access to the protected resource 18. An access control layer 16 may be used to secure access to the protected resource 18. The access control layer 16 may implement conventional access control rules, such as using static tokens. That is, the access control layer 16 may implement conventional token based authorization, or other static information based authorization (e.g. IP address based access control).

In the present example, an instance 22 of the client application ("client application instance") is being executed on the user device from a zero trust zone 12. Meanwhile, an instance 24 of the service application ("service application instance") is being executed on the back-end service also from a zero trust zone 14. The zero trust zone can be a publicly accessible data network, such as the Internet or a public cloud. Within the zero trust zones, no static information can be assumed safe from bad actors.

In embodiments of the present invention, the network security system includes a set of components that are deployed in the network environment and operating in conjunction to realize dynamic access control for the protected resource 18. In the present embodiment, the network security system includes a transaction monitor 60 and an access control manager 70, both are deployed outside of the zero trust zones of the client application instance and the service application instance. The network security system further includes a ticket-based access control layer 64 deployed at the front-end of the protected resource 18 and working in conjunction with the access control manager 70 to implement access control to the protected resource. In some embodiments, the ticket-based access control layer 64 is provided in addition to the access control layer 16 implementing conventional access control schemes.

The transaction monitor 60 monitors run-time transactions between the client application instance 22 and the service application instance 24. The transaction monitor 60 provides run-time application transaction information to the access control manager 70. The access control manager 70 provides a run-time access ticket 72, also referred to as an "access ticket" or a "run-time ticket," and synchronizes the access ticket with the ticket-based access control layer 64. The access ticket 72 provided by the access control manager to the ticket-based access control layer 64 is referred herein as a "validated access ticket" and is used to validate a run-time access ticket 62 provided by the service application instance during a connection session. The run-time access ticket 62 provided by the service application instance will be referred herein as a "service access ticket" to denote the access ticket as being provided by the service application instance.

Methods for generating or providing the run-time access tickets (the validated access ticket 72 and/or the service access ticket 62) in the network security system will be described in more detail below. For instance, the service access ticket 62 may be generated by the service application 24 or may be generated elsewhere and obtained by the service application 24 and provided to the ticket-based access control layer 64. Alternately, the service access ticket 62 may be injected into the communication path between the service application instance and the ticket-based access control layer 64, as will be described in more detail below. With the validated access ticket 72 and the service access ticket 62 provided to the ticket-based access control layer 64, the ticket-based access control layer 64 applies access control rules to grant or deny the access request from the service application instance 24.

It is instructive to note that the service application 24 may obtain the service access ticket without using any static token which can potentially be exposed to bad actors having access to the back-end server platform. The run-time access tickets are generated and used during application runtime. The dynamically generated run-time access ticket exists only in memory or in transit, thus drastically reducing potential exposure to bad actors in the zero trust zone. Also, the use of the dynamically generated run-time access ticket drastically reduces the potential risk exposure even if a runtime access ticket itself is somehow exposed because the runtime ticket is only useful during the transient runtime session.

In operation, the client application instance 22 interacts with the service application instance 24 to make a request for data from the protected resource 18. The transaction monitor 60 monitors and detects the run-time application transaction information which is provided to the access control manager 70. The access control manager 70 generates or provides a validated access ticket 72 to the ticket-based access control layer 64. Meanwhile, the service application instance 24 transmits a request for data to the protected resource. The request includes a service access ticket 62. The request from the service application instance 24 is intercepted by the access control layer 16 applying traditional access control rules using static information. The request is also intercepted by the ticket-based access control layer 64 which validates the service access ticket 62 using the validated access ticket 72.

In response to the service access ticket being validated, the request to access the protected resource 18 will be granted. In response to the service access ticket not being validated or in the absence of the service access ticket in the request, the request to access the protected resource 18 will be denied.

In some embodiments, the transaction monitor 60 is implemented as a software appliance executed on a processor, such as a self-contained virtual machine, with a virtual interface working as a virtual tap to the virtual network switch to which the service application is connected. In other embodiments, the transaction monitor software can be ported to a hardware server appliance with a physical network interface tapping a physical network switch. The hardware server appliance performs the same functionality of the transaction monitor as the software appliance. In some embodiments, the transaction monitor 60 implements a network packet reassembly function that extracts data payloads from network connections. The transaction monitor 60 includes an intelligent network protocol parser to analyze network protocols and extract application API level data from the data payloads. In this manner, the transaction monitor 60 obtains run-time application transaction information or data from the network connections between the client application and the service application.

In another embodiment, the transaction monitor is implemented as a software that is run directly on a server or a client platform as a software process. In yet another embodiment, when applied to a containerized service environment, the transaction monitor software is implemented to run as a container tapping the shared container virtual interface. In a fifth embodiment, the transaction monitor is implemented as a "serverless" function monitoring the incoming and/or outgoing request and/or response in a serverless environment (e.g. Amazon AWS Lambda). In a sixth embodiment, the transaction monitor is implemented as software deployed as a consumer of a message bus (e.g. a KAFKA message bus common to many modern message bus based architecture). In summary, as long as the transaction monitor can gain access to the network API data in between services, the transaction monitor can perform the transaction monitoring function. The actual packaging and deployment options of the transaction monitor is not limited to the above-described embodiments and other implementation and deployment methods may be used. It is only necessary that the required network API data is made available to the transaction monitor.

In some embodiments, the access control manager 70 is implemented as a software service executed on a processor. The main function of the access control manager 70 is to maintain a mapping between runtime session information and the access ticket. In some embodiments, the access control manager implements the access ticket generation algorithms and access ticket maintenance algorithms as disclosed above.

In some embodiments, the ticket-based access control layer 64 is implemented as an additional run-time module to the access control layer 16. In particular, protected resources typically implement some sort of access control layer that control access to resources based on static information. In the present description, an access control layer that implements protection functions based on static information, such as access control layer 16 in FIG. 2, is referred to as a traditional access control layer. In embodiments of the present invention, the network security system implements an additional run-time module that is added to the traditional access control layer 16 to implement the additional run-time access control methods. In the present description, the additional run-time module is referred to as a ticket-based access control layer, such as the ticket-based access control layer 64 in FIG. 2. In one example embodiment, the enterprise application is implemented using Amazon Web Services (AWS) and the protected resource is implemented on an Amazon S3 (Amazon Simple Storage Service) storage. The ticket-based access control layer is implemented as an AWS Lamda function which is added to the AWS S3 Access Control Layer to implement the additional access ticket validation.

The network security system of the present invention can be advantageously applied to protect against security breaches that are not protected by traditional or conventional security measures. In one example, the network security system is applied to protect against direct link problems for access to the protected resource. A direct link problem can arise as follows: a user login to the enterprise application and obtains a link to a document stored on the protected resource. The link should permit only a user who has logged in to the enterprise application to access the document. However, in order to improve performance, the link that is provided to the user is a direct link to the document stored in the protected resource. That is, with the direct link, anyone can access the document directly from the protected resource, without having to log in and provide valid user credentials. In some cases, the direct link is supposed to be used only by the service application but the link is exposed to the user In this case, the direct link can be exploited by a bad actor and the bad actor is able to access the protected resource using the direct link, even if the bad actor does not have the user's login credentials. The network security system of the present invention is implemented to close the security gap exposed by the direct link problem. With the network security system implemented, an access ticket is generated or provided based on run-time transaction information. Thus, the access ticket is generated only after a user is logged in and has provided valid user credentials. Without the access ticket, no one can access the protected resource even if the person provides a valid direct link to a document in the protected resource.

In another example, the network security system is applied to protect against rogue admin problems. A system administrator of the enterprise application or any person with root access to the enterprise's data network can obtain the secrete key or other static credential materials to generate valid access tokens so as to access the protected resource. Using the secrete key, the rogue admin can generate access links to the protected resource from any network outside of the service application platform, thereby avoiding detection.

In this case, the network security system of the present invention is implemented to close the security gap caused by a rogue admin. With the network security system implemented, an access ticket is generated or provided based on run-time transaction information. Thus, even if a network node provides valid access token to access the protected resource, the network node cannot provide an access ticket as the access ticket is only generated using run-time transaction information. A bad actor using the secret key information provided by a rogue admin may be able to create the direct access link to the protected resource but the ticket-based access control layer will deny the access because the direct access link is not accompanied by a valid access ticket as there is no login session actually initiated.

Figure 3:
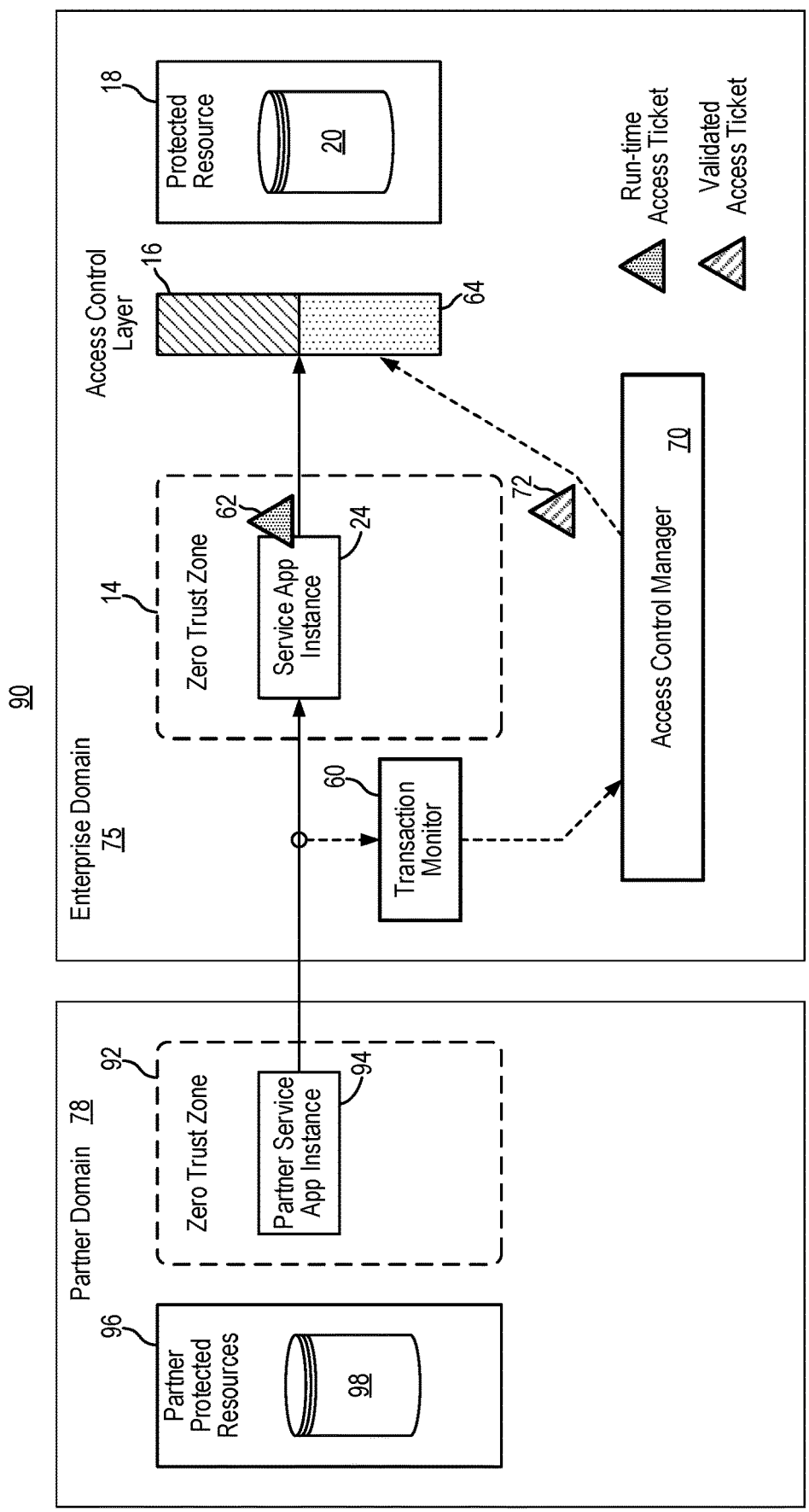
FIG. 3 illustrates an environment in which a network security system is implemented in embodiments of the present invention.

The network security system providing dynamic access control may also be implemented to an environment where the client application is an instance embedded in another service application front-ending another data source. FIG. 3 illustrates an environment in which a network security system is implemented in embodiments of the present invention. Like elements in FIGS. 2 and 3 are given like reference numerals to simply the discussion. Referring to FIG. 3, in some applications, an enterprise wishes to share data stored in a protected source with a partner enterprise which also store the shared data in a protected resource. This use case is sometimes referred to as managed resource to managed resource data transfer. For instance, an enterprise application is deployed in an enterprise domain 75. The service application instance 24 of the enterprise application is provided to receive requests for data from the protected resource 18. A partner enterprise, operating in a partner domain 78, may wish to obtain data from the protected resource. The partner enterprise implements a partner application including a partner service application instance 94.

To facilitate the data transfer, the enterprise does not want to provide a direct link to the partner enterprise to access the protected resource as such direct link can be exploited by bad actors. The enterprise wants to ensure that only the enterprise application or the partner's own application is used to transfer data back-and-forth between the managed resources. In embodiments of the present invention, the network security system is implemented to provide security measures in the managed resource to managed resource data transfer situation. As shown in the network environment 90, the partner service application is treated as a trusted client application. Accordingly, all network security systems and methods described herein related to a client application apply equally to the partner service application. The partner service application instance 94, which may be in a zero trust zone 92, transmits requests to the enterprise's service application instance 24. The transaction monitor 60 obtains run-time application transaction information which is used by the access control manager 70 to generate the validated access ticket 72. The validated access ticket 72 is used by the ticket-based access control layer 64 to validate requests for data from the service application instance 24. The service application instance 24 has to provide a service access ticket 62 that can be validated by the ticket-based access control layer 64 in order to be granted access to the protected resource 18. By using the access ticket, the network security system ensures that data transfer occurs only between the enterprise data store 20 and the partner data store 98.

In one example, two enterprise partners leverage their own Amazon Virtual Private Clouds (VPCs) to collaborate. By implementing the network security system of the present invention, the two enterprise partners have the assurance that data can only be transferred between their managed AWS S3 buckets.

Figure 4:
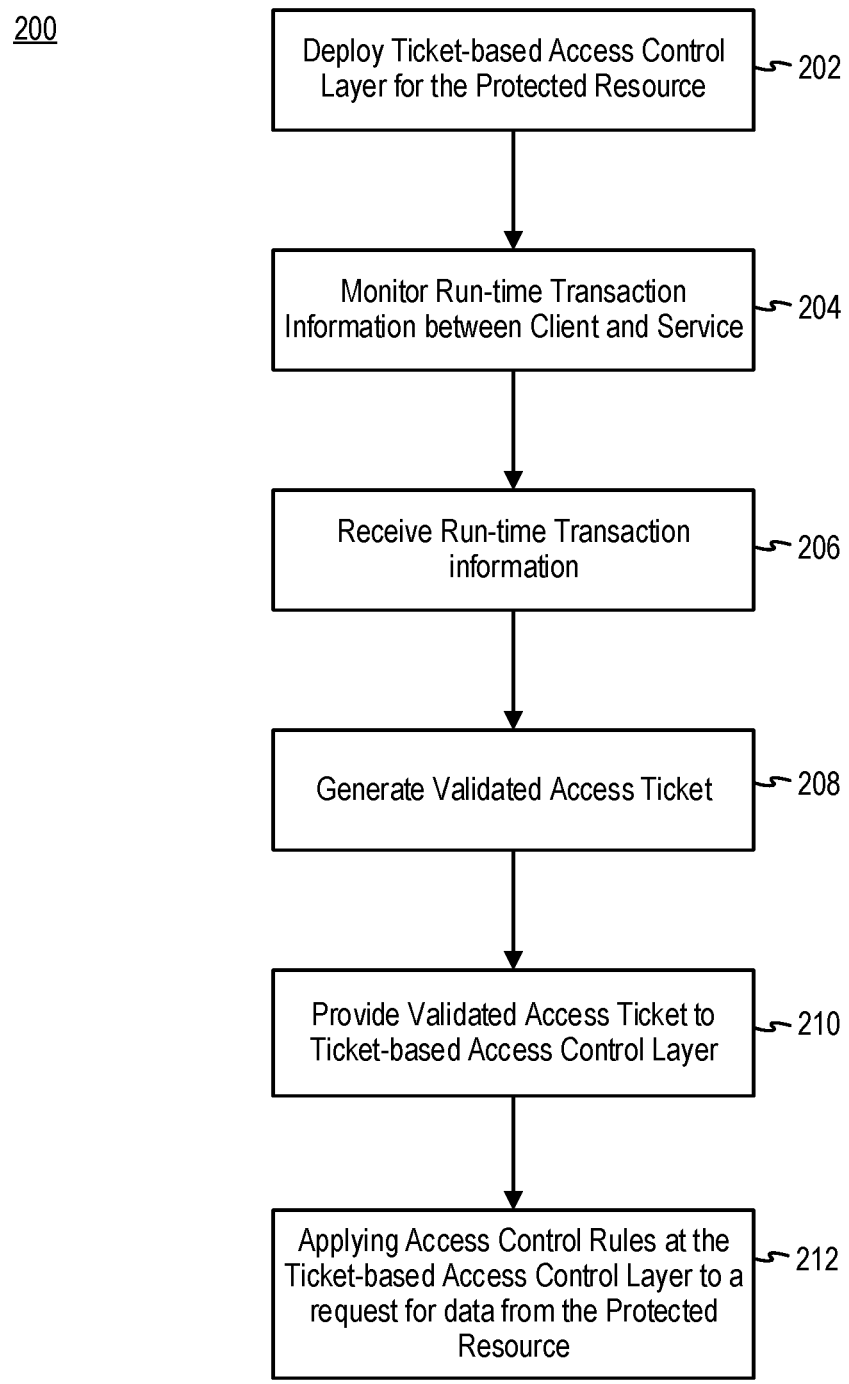
FIG. 4 is a flowchart illustrating a network security method for providing access control to a protected resource in some embodiments.

FIG. 4 is a flowchart illustrating a network security method for providing access control to a protected resource in some embodiments. The network security method uses run-time transaction data between a client application and a service application in a zero trust environment where the service application accesses the protected resource in response to a request from the client application. The method in FIG. 4 can be implemented in the network security system of FIG. 2 or 3 in some embodiments. Referring to FIG. 4, a method 200 starts by deploying a ticket-based access control layer for the protected resource (202). The method 200 monitors the run-time transaction information between the client application and the service application (204). The method 200 receives run-time transaction information in response to the monitoring (206). The method 200 then generates a validated access ticket using the received run-time transaction information (208). The method 200 provides the validated access ticket to the ticket-based access control layer (210). The method 200 then applies access control rules at the ticket-based access control layer to a request from the service application for data from the protected resource (212).

In one embodiment, the method may further deny access to the protected resource in response to an access ticket not being provided by the service application to the ticket-based access control layer. In another embodiment, the method may further receive, at the ticket-based access control layer, a service access ticket from the service application. The method may further grant access to the protected resource in response to the service access ticket being validated using the validated access ticket. Alternately, the method may deny access to the protected resource in response to the service access ticket not being validated using the validated access ticket.

Access Control Methods

The network security system and method of the present invention relies on the generation or provision of a run-time access ticket to validate the request for access. FIGS. 5-9 illustrate methods which can be used to generate or provide the run-time access tickets. The methods illustrated in FIGS. 5-9 are illustrative only and not intended to be limiting. Other methods for generating or providing the run-time access ticket are possible within the scope of the present invention.

(1) Independent Ticket Generation

Figure 5:
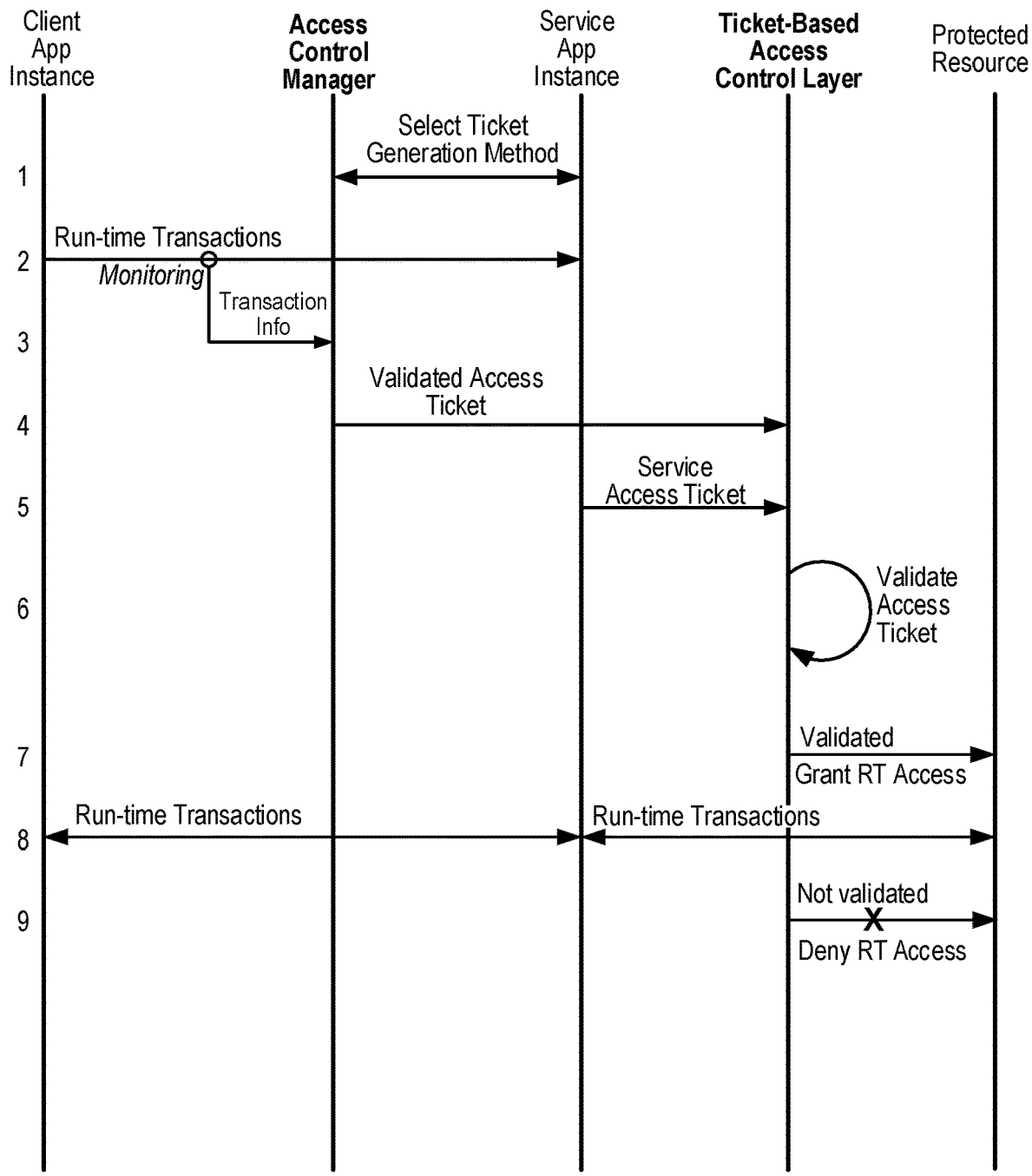
FIG. 5 illustrates a method for generating access tickets in the network security system in embodiments of the present invention.

FIG. 5 illustrates a method for generating access tickets in the network security system in embodiments of the present invention. The method in FIG. 5 can be implemented in the network security system of FIG. 2 or 3 in some embodiments. In particular, FIG. 5 describes a method for independent ticket generation. Referring to FIG. 5, at 1, the access control manager selects a ticket generation method and shares the selected ticket generation method with the service application or an instance of the service application. In another embodiment, the access control manager and the service application can negotiate to agree on a selected ticket generation method. The selected ticket generation method identifies the run-time transaction information and the ticket generation algorithm that is to be used to generate a run-time access ticket. In one example, a web API based service uses a cookie key-value pair to maintain a connection session. The ticket generation method can use the key-value pair which identifies the connection session as the run-time transaction information to construct the access ticket. In another example, the ticket generation method can further generate a random number (or a pseudo-random number) which is appended to the key-value pair of the connection session. Using a random number in the run-time access ticket increases the entropy of the resulting access ticket. In one embodiment, the ticket generation method executes a pseudo-random number generation method to generate a pseudo-random number as the random number.

In one embodiment, the ticket generation method generates an access ticket using the session information (such as the cookie key-value pair used to maintain the connection session) with a random number (or pseudo-random number) appended thereto. It is instructive to note that because both the session information and the random number would only be visible during run-time, the access ticket is thus generated using dynamic run-time transaction information, instead of static information, such as an access token. The access ticket thus generated is thus robust against misappropriation.

At 2, the client application instance and the service application instance interacts to conduct run-time transactions in the course of application functions. For example, the client application can make API calls to the service application to request data from the protected resource. At 3, the method monitors the run-time transaction information between the client application instance and the service application instance and provides the monitored information to the access control manager. For example, the method may use the transaction monitor to capture the run-time transaction information. The run-time transaction information, which can be in the form of a cookie, would only be visible to the transaction monitor at run-time. For example, the run-time transaction information can be the session information, such as the cookie key-value pair used to maintain the connection session and provides the session information to the access control manager.

At 4, the access control manager, using the received run-time transaction information, generates a run-time access ticket using the selected ticket generation method. For example, the access control manager generates the run-time access ticket using the session information in the received run-time transaction information and appends a random number thereto. The access ticket generated by the access control manager is referred herein as a validated access ticket. In operation, the access control manager generates a list of validated access tickets for all of the connection sessions being monitored. That is, the transaction monitor and the access control manager may be deployed to operate with a number of client application instances and a number of service application instances. The access control manager generates a validated access ticket for each connection session using the run-time transaction information for that connection session. The validated access tickets generated by the access control manager is provided to the ticket-based access control layer.

Meanwhile, at 5, the service application instance uses the selected ticket generation method to generate a run-time access ticket independently. For instance, the service application instance uses the run-time transaction information, such as the session information, that the service application instance receives in its own interaction with the client application instance. The service application instance generates a service access ticket using the session information with a random number (or pseudo-random number) appended thereto. It is instructive to note that the selected ticket generation method implements a pseudo-random number generation method so that the access control manager and the service application instance generate the same pseudo-random number. The service access tickets generated by the service application instance is provided to the ticket-based access control layer.

At 6, the ticket-based access control layer validates the service access ticket received from the service application instance using the validated access ticket provided by the access control manager. In one embodiment, the ticket-based access control layer determines if the service access ticket matches the validated access ticket. In another embodiment, the ticket-based access control layer determines if the service access ticket matches a validated access ticket in a list of validated access tickets stored on the ticket-based access control layer. In some embodiments, the method may implement other access control checks, such as the conventional token based authorization, in additional to the access ticket access control check.

At 7, in the event the service access ticket matches a validated access ticket, the ticket-based access control layer validates the service access ticket and grants run-time access to the protected resource. In some embodiment, the access is granted only after the access ticket access control check is satisfied and other access control checks are performed. At 8, the service application instance performs run-time transactions to obtain the resource requested by the client application instance from the protected resource. The service application instance interacts with the client application instance to provide the requested resource or data.

At 9, in the event the service access ticket does not match the validated access ticket or any validated access ticket in the list, the ticket-based access control layer denies the run-time access to the protected resource. The service application instance cannot access the protected resource even if other access control checks, such as the conventional token based authorization, are satisfied. In some embodiments, in the event that no service access ticket is provided by the service application instance, the ticket-based access control layer will also deny the run-time access to the protected resource, regardless of the result of other access control checks. That is, even if the conventional token based authorization is satisfied, access control to the protected resource will be denied if no access ticket is provided or no valid access ticket is provided.

The independent ticket generation method of FIG. 5 operates by having the access control manager and the service application independently generate the same access ticket using at least in part the run-time transaction information. The independent ticket generation method is implemented by embedding security-related code in the service application so that the service application can independently generate the access ticket. No modification to the client application is required. In this manner, access control to the protected resource is secured as access control is granted only for a valid run-time session between the client application and the service application.

(2) Client Initiated Ticket Generation

Figure 6:
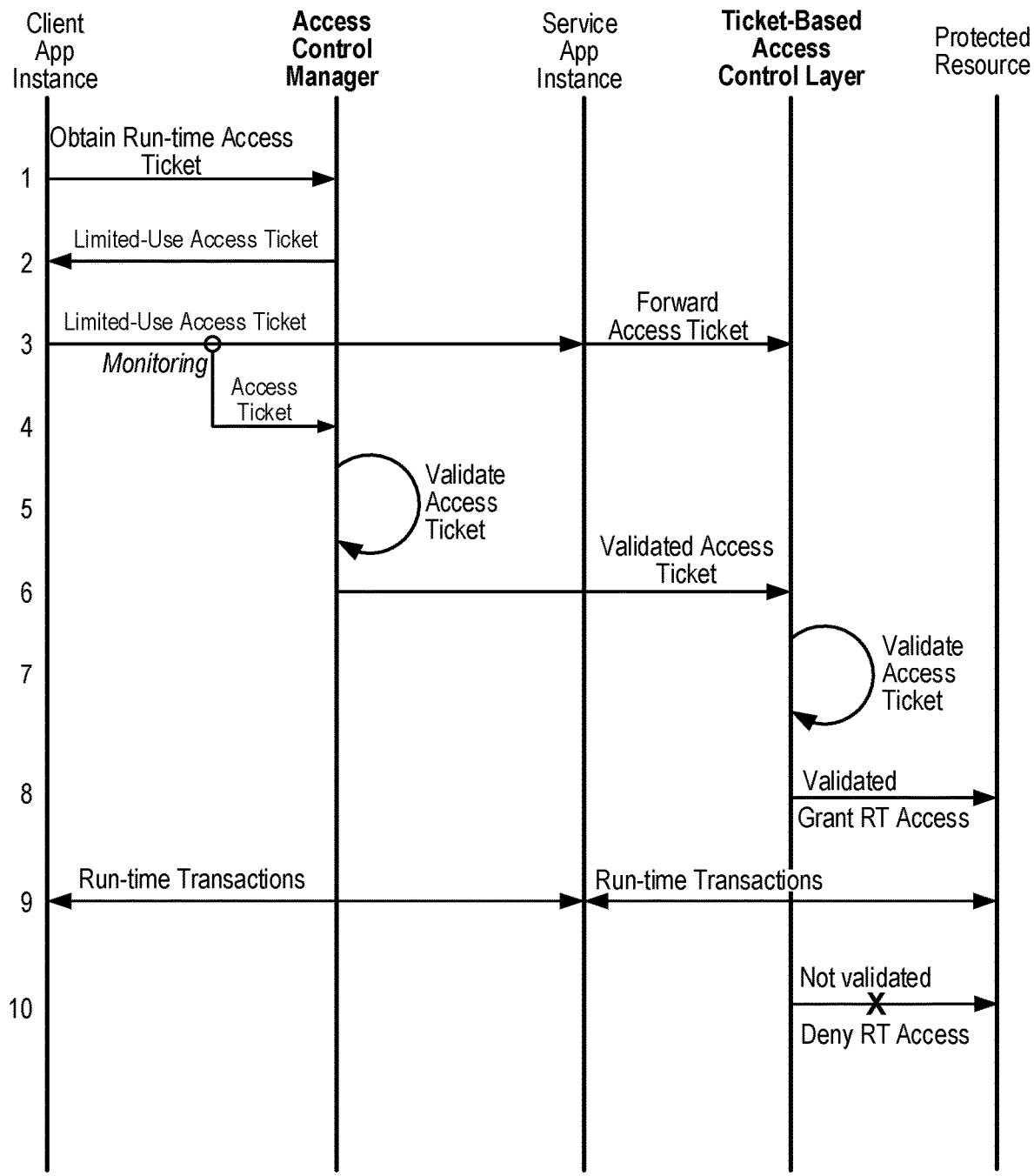
FIG. 6 illustrates a method for generating access tickets in the network security system in embodiments of the present invention.

FIG. 6 illustrates a method for generating access tickets in the network security system in embodiments of the present invention. The method in FIG. 6 can be implemented in the network security system of FIG. 2 or 3 in some embodiments. In particular, FIG. 6 describes a method for client initiated ticket generation. Referring to FIG. 6, at 1, the client application is modified to cause the client application to make a call to the access control manager for a limited-use access ticket. In some embodiments, the limited-use access ticket is a randomized limited-use access ticket. The client application can be modified to make an API call to the access control manager. At 2, the access control manager provides the limited-use access ticket to the client application instance.

At 3, the client application instance interacts with the service application in the course of application functions. For example, the client application instance can make API calls to the service application instance to request data from the protected resource. The client application instance submits the limited-use access ticket with the API calls to the service application. The run-time transaction information is monitored by the transaction monitor. Meanwhile, the service application instance forwards the limited-use access ticket received from the client application instance as the service access ticket to the ticket-based access control layer while the service application instance performs application functions on behalf of the client application.

At 4, the transaction monitor detects the limited-used access ticket in the run-time transaction information. The transaction monitor provides the limited-used access ticket to the access control manager and informs the access control manager that the access ticket has been originated from the client application instance.

At 5, the access control manager validates the access ticket received from the monitoring. The access control manager validates the access ticket only after the access ticket is being observed by the transaction monitor independently. This would prevent an issued access ticket from being used directly, without user login, to gain access without going through the properly monitored service application instance frontend. At 6, the access control manager provides the validated access ticket to the ticket-based access control layer. In some embodiments, the access control manager provides a list of validated access tickets to the ticket-based access control layer for all of the access tickets issued to client application instances and validated from the monitored run-time transaction information.

At 7, the ticket-based access control layer validates the service access ticket received from the service application instance using the validated access ticket provided by the access control manager. In one embodiment, the ticket-based access control layer determines if the service access ticket matches the validated access ticket. In another embodiment, the ticket-based access control layer determines if the service access ticket matches a validated access ticket in a list of validated access tickets stored on the ticket-based access control layer. In some embodiments, the method may implement other access control checks, such as the conventional token based authorization, in additional to the access ticket access control check.

At 8, in the event the service access ticket matches a validated access ticket, the ticket-based access control layer validates the service access ticket and grants run-time access to the protected resource. In some embodiment, the access is granted only after the access ticket access control check is satisfied and other access control checks are performed. At 9, the service application instance performs run-time transactions to obtain the resource requested by the client application instance from the protected resource. The service application instance interacts with the client application instance to provide the requested resource or data.

At 10, in the event the service access ticket does not match the validated access ticket or any validated access ticket in the list, the ticket-based access control layer denies the run-time access to the protected resource. The service application instance cannot access the protected resource even if other access control checks, such as the conventional token based authorization, are satisfied. In some embodiments, in the event that no service access ticket is provided by the service application instance, the ticket-based access control layer will also deny the run-time access to the protected resource, regardless of the result of other access control checks. That is, even if the conventional token based authorization is satisfied, access control to the protected resource will be denied if no access ticket is provided or no valid access ticket is provided.

The client initiated ticket generation method of FIG. 6 operates by modifying the client application to contact the access control manager for the access ticket. The service application only needs to be developed as a simple forwarder, forwarding the access ticket provided by the client application. In this manner, access control to the protected resource is secured as access control is granted only for a valid run-time session between the client application and the service application where the client application initiates a request for the access ticket.

(3) Service Initiated Ticket Generation

Figure 7:
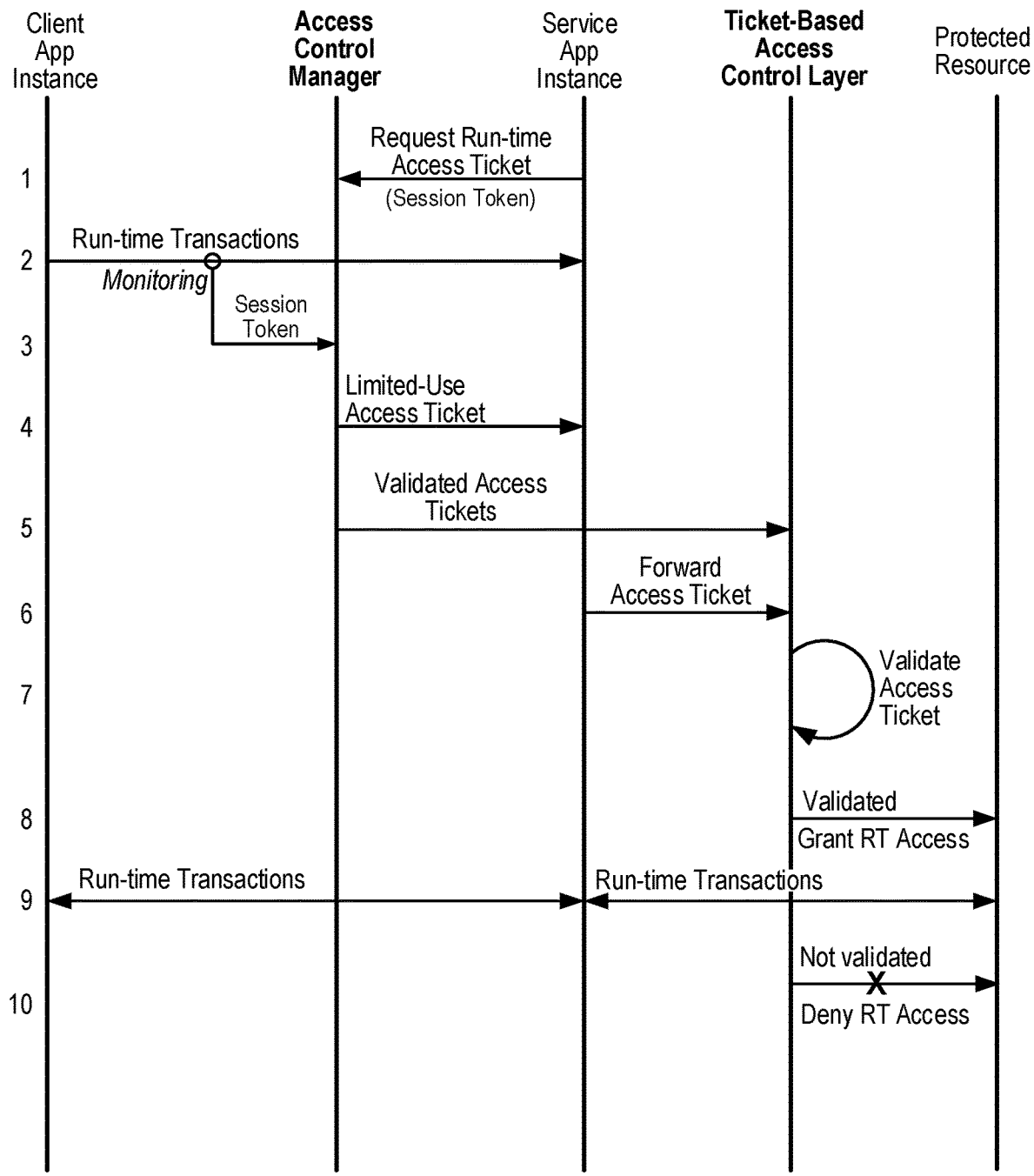
FIG. 7 illustrates a method for generating access tickets in the network security system in embodiments of the present invention.

FIG. 7 illustrates a method for generating access tickets in the network security system in embodiments of the present invention. The method in FIG. 7 can be implemented in the network security system of FIG. 2 or 3 in some embodiments. In particular, FIG. 7 describes a method for service initiated ticket generation. Referring to FIG. 7, at 1, the service application is modified to cause the service application to make a call to the access control manager to request a limited-use access ticket. To prevent potential bad actors in the service application zero trust zone from obtaining an access ticket, the service application instance provides in the request a session token from the run-time transaction as proof.

Meanwhile, at 2, the client application instance interacts with the service application in the course of application functions. For example, the client application instance can make API calls to the service application instance to request data from the protected resource. The service application instance performs application functions on behalf of the client application and makes the request for data from the protected resource on behalf of the client application. At 3, the run-time transaction information is monitored by the transaction monitor. The transaction monitor provides run-time transaction information, such as the session token, to the access control manager.

At 4, after verifying the session token received from the monitoring and the session token received from the request from the service application instance, the access control manager provides a limited-use access ticket to the service application instance. In some embodiments, the limited-use access ticket is a randomized limited-use access ticket. The access ticket issued by the access control manager is the validated access ticket. In the event the session token received from the service application instance is not verified, no access ticket will be issued to the service application instance.

At 5, the access control manager provides the validated access ticket to the ticket-based access control layer. In some embodiments, the access control manager provides a list of validated access tickets to the ticket-based access control layer for all of the access tickets issued to service application instances and validated from the monitored run-time transaction information. At 6, the service application instance forwards the limited-use access ticket issued by the access control manager to the ticket-based access control layer as the service access ticket.

At 7, the ticket-based access control layer validates the service access ticket received from the service application instance using the validated access ticket provided by the access control manager. In one embodiment, the ticket-based access control layer determines if the service access ticket matches the validated access ticket. In another embodiment, the ticket-based access control layer determines if the service access ticket matches a validated access ticket in a list of validated access tickets stored on the ticket-based access control layer. In some embodiments, the method may implement other access control checks, such as the conventional token based authorization, in additional to the access ticket access control check.

At 8, in the event the service access ticket matches a validated access ticket, the ticket-based access control layer validates the service access ticket and grants run-time access to the protected resource. In some embodiment, the access is granted only after the access ticket access control check is satisfied and other access control checks are performed. At 9, the service application instance performs run-time transactions to obtain the resource requested by the client application instance from the protected resource. The service application instance interacts with the client application instance to provide the requested resource or data.

At 10, in the event the service access ticket does not match the validated access ticket or any validated access ticket in the list, the ticket-based access control layer denies the run-time access to the protected resource. The service application instance cannot access the protected resource even if other access control checks, such as the conventional token based authorization, are satisfied. In some embodiments, in the event that no service access ticket is provided by the service application instance, the ticket-based access control layer will also deny the run-time access to the protected resource, regardless of the result of other access control checks. That is, even if the conventional token based authorization is satisfied, access control to the protected resource will be denied if no access ticket is provided or no valid access ticket is provided.

The service initiated ticket generation method of FIG. 7 operates by modifying the service application to contact the access control manager for the access ticket. The client application does not need to be modified. In this manner, access control to the protected resource is secured as access control is granted only for a valid run-time session between the client application and the service application where the service application initiates a request for the access ticket.

(4) Front-End Injection of Access Ticket

Figure 8:
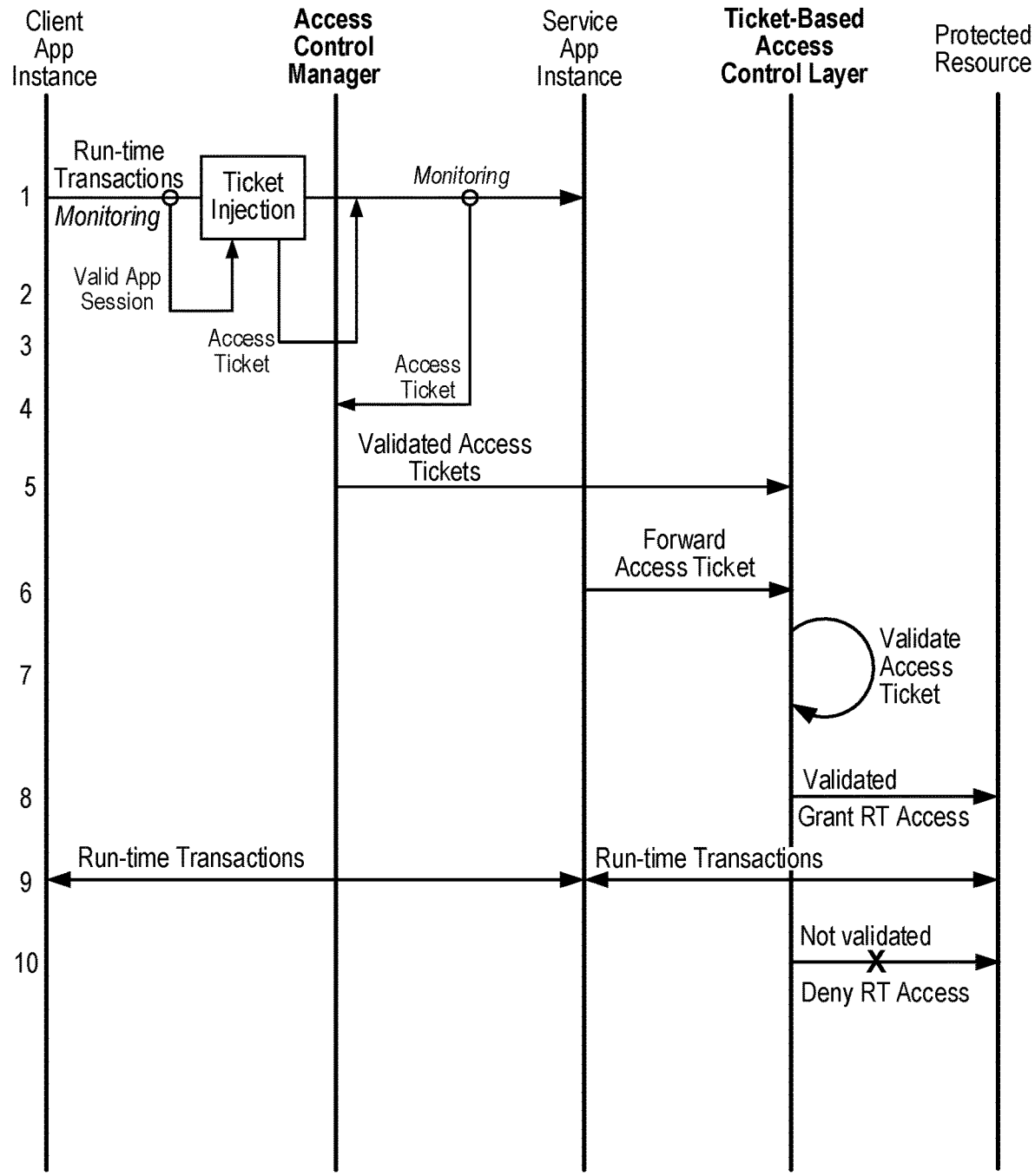
FIG. 8 illustrates a method for generating access tickets in the network security system in embodiments of the present invention.

FIG. 8 illustrates a method for generating access tickets in the network security system in embodiments of the present invention. The method in FIG. 8 can be implemented in the network security system of FIG. 2 or 3 in some embodiments. In particular, FIG. 8 describes a method for direct front-end injection of an access ticket. To that end, an inline ticket generator module (or ticket injection module) is inserted in the communication path between the client application instance and the service application instance. The inline ticket generator module is used to directly inject an access ticket in the communication path between the client application instance and the service application instance. In some embodiments, the inline ticket generator module for injecting the access tickets is implemented inline with the API call flow to inject data packets rather than being a passive monitor.

Referring to FIG. 8, at 1, the client application instance interacts with the service application in the course of application functions. For example, the client application instance can make API calls to the service application instance to request data from the protected resource. The service application instance performs application functions on behalf of the client application and makes the request for data from the protected resource on behalf of the client application. At 2, the run-time transaction information is monitored by the transaction monitor. The transaction monitor determines whether a valid client application login session has been established. At 3, in the event the transaction monitor determines that a valid client application login session has been established, the transaction monitor instructs the inline ticket generator module to generate an access ticket and inject the access ticket into the communication path between the client application instance and the service application instance.

At 4, the transaction monitor detects the injected access ticket in the run-time transaction information. The transaction monitor provides the injected access ticket to the access control manager and informs the access control manager that the access ticket has been originated from the client application instance. In other words, even though the access ticket has been injected, the injected access ticket behaves as if it has been provided by the client application instance.

At 5, the access control manager validates the access ticket received from the monitoring. The access control manager validates the access ticket when the access ticket is being observed by the transaction monitor independently. This would prevent an issued access ticket from being used directly, without user login, to gain access without going through the properly monitored service application instance frontend. The access control manager provides the validated access ticket to the ticket-based access control layer. In some embodiments, the access control manager provides a list of validated access tickets to the ticket-based access control layer for all of the access tickets issued to client application instances and validated from the monitored run-time transaction information.

Meanwhile, at 6, the service application instance forwards the injected access ticket received on the communication path from the client application instance as the service access ticket to the ticket-based access control layer while the service application instance performs application functions on behalf of the client application.

At 7, the ticket-based access control layer validates the service access ticket received from the service application instance using the validated access ticket provided by the access control manager. In one embodiment, the ticket-based access control layer determines if the service access ticket matches the validated access ticket. In another embodiment, the ticket-based access control layer determines if the service access ticket matches a validated access ticket in a list of validated access tickets stored on the ticket-based access control layer. In some embodiments, the method may implement other access control checks, such as the conventional token based authorization, in additional to the access ticket access control check.

At 8, in the event the service access ticket matches a validated access ticket, the ticket-based access control layer validates the service access ticket and grants run-time access to the protected resource. In some embodiment, the access is granted only after the access ticket access control check is satisfied and other access control checks are performed. At 9, the service application instance performs run-time transactions to obtain the resource requested by the client application instance from the protected resource. The service application instance interacts with the client application instance to provide the requested resource or data.

At 10, in the event the service access ticket does not match the validated access ticket or any validated access ticket in the list, the ticket-based access control layer denies the run-time access to the protected resource. The service application instance cannot access the protected resource even if other access control checks, such as the conventional token based authorization, are satisfied. In some embodiments, in the event that no service access ticket is provided by the service application instance, the ticket-based access control layer will also deny the run-time access to the protected resource, regardless of the result of other access control checks. That is, even if the conventional token based authorization is satisfied, access control to the protected resource will be denied if no access ticket is provided or no valid access ticket is provided.

The front-end injection of access ticket method of FIG. 8 operates similarly to the client-initiated ticket generation method of FIG. 6 except that no modification to the client application is required. By using the front-end injection of access ticket, access control to the protected resource is secured as access control is granted only for a valid run-time session between the client application and the service application.

(5) Double Injection of Access Ticket

Figure 9:
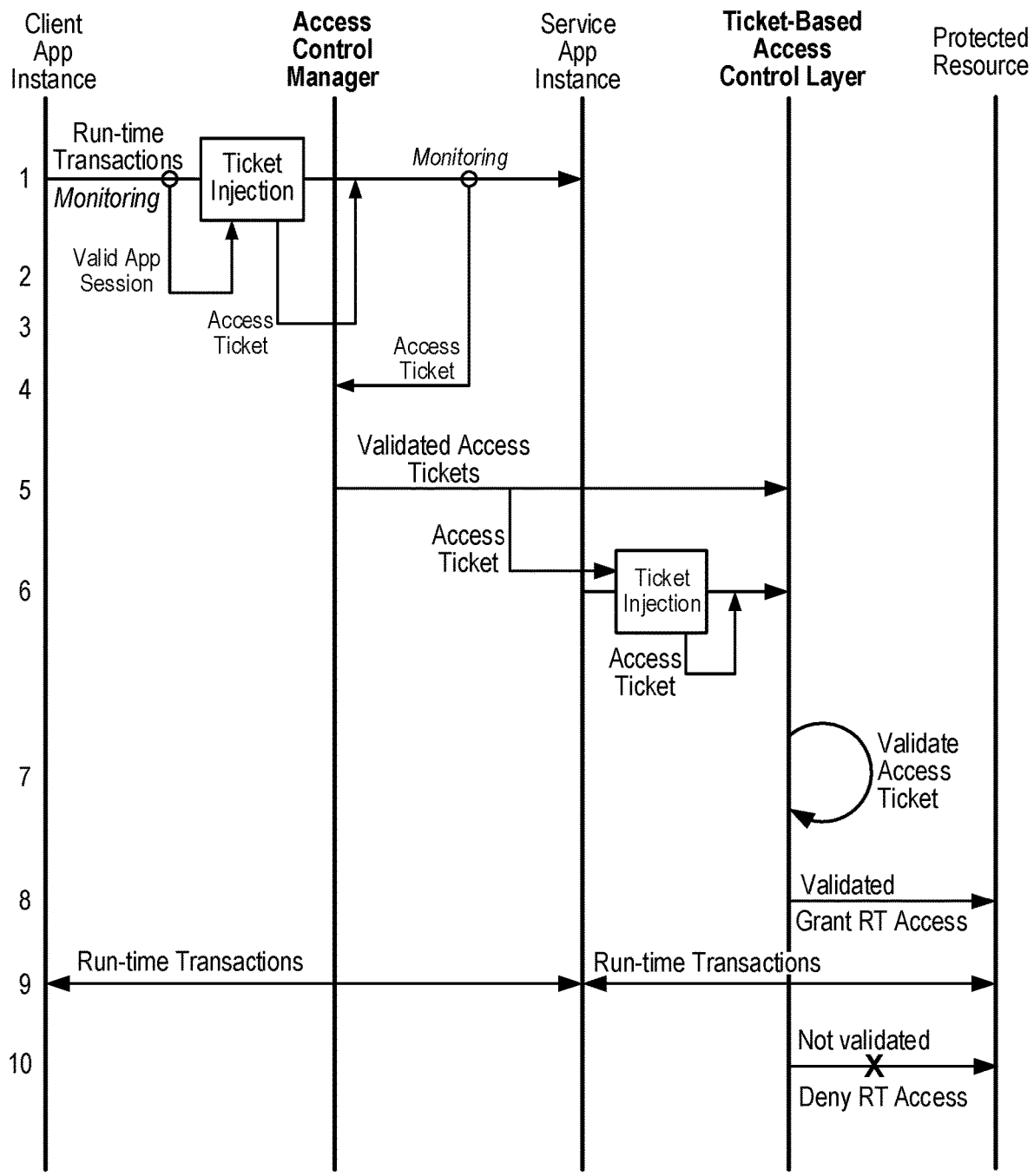
FIG. 9 illustrates a method for generating access tickets in the network security system in embodiments of the present invention.

FIG. 9 illustrates a method for generating access tickets in the network security system in embodiments of the present invention. The method in FIG. 9 can be implemented in the network security system of FIG. 2 or 3 in some embodiments. In particular, FIG. 9 describes a method for double injection of an access ticket. To that end, two inline ticket generator modules are used to inject the access ticket. A first inline ticket generator module is inserted in the communication path between the client application instance and the service application instance. The first inline ticket generator module is used to directly inject an access ticket in the communication path between the client application instance and the service application instance. A second inline ticket generator module is inserted in the communication path between the service application instance and the ticket-based access control layer. The second inline ticket generator module is used to directly inject an access ticket in the communication path between the service application instance and the ticket-based access control layer.

Referring to FIG. 9, at 1, the client application instance interacts with the service application in the course of application functions. For example, the client application instance can make API calls to the service application instance to request data from the protected resource. The service application instance performs application functions on behalf of the client application and makes the request for data from the protected resource on behalf of the client application. At 2, the run-time transaction information is monitored by the transaction monitor. The transaction monitor determines whether a valid client application login session has been established. At 3, in the event the transaction monitor determines that a valid client application login session has been established, the transaction monitor instructs the first inline ticket generator module to generate an access ticket and inject the access ticket into the communication path between the client application instance and the service application instance.

At 4, the transaction monitor detects the injected access ticket in the run-time transaction information. The transaction monitor provides the injected access ticket to the access control manager and informs the access control manager that the access ticket has been originated from the client application instance. In other words, even though the access ticket has been injected, the injected access ticket behaves as if it has been provided by the client application instance.

At 5, the access control manager validates the access ticket received from the monitoring. The access control manager validates the access ticket when the access ticket is being observed by the transaction monitor independently. This would prevent an issued access ticket from being used directly, without user login, to gain access without going through the properly monitored service application instance frontend. The access control manager provides the validated access ticket to the ticket-based access control layer. In some embodiments, the access control manager provides a list of validated access tickets to the ticket-based access control layer for all of the access tickets issued to client application instances and validated from the monitored run-time transaction information. Meanwhile, the access control manager provides the validated access ticket to the second inline ticket generator module and instructs the second inline ticket generator module to inject the access ticket into the communication path between the service application instance and the ticket-based access control layer. For example, the second inline ticket generator module can inject the access ticket into the service application instance API call to the protected resource. The injected access ticket is received by the ticket-based access control layer as the service access ticket.

In alternate embodiments, the first inline ticket generator module generates the access ticket using run-time transaction information, such as the session token, between the client application and the service application. Furthermore, instead of the access control manager providing the validated access ticket to the second inline ticket generator module, the access control manager may simply instruct the second inline ticket generator module to generate the service access ticket using run-time transaction information, such as the session token. In this manner, the second inline ticket generator module generates the service access ticket while relying on the same run-time transaction information as the first inline ticket generator module. The service access ticket is thus consistent with the injected access ticket by the first inline ticket generator module and is therefore consistent with the validated access ticket.

At 6, the service application instance interacts with the ticket-based access control layer while performing application functions on behalf of the client application. The injected access ticket is provided as the service access ticket to the ticket-based access control layer.

At 7, the ticket-based access control layer validates the service access ticket using the validated access ticket provided by the access control manager. In one embodiment, the ticket-based access control layer determines if the service access ticket matches the validated access ticket. In another embodiment, the ticket-based access control layer determines if the service access ticket matches a validated access ticket in a list of validated access tickets stored on the ticket-based access control layer. In some embodiments, the method may implement other access control checks, such as the conventional token based authorization, in additional to the access ticket access control check.

At 8, in the event the service access ticket matches a validated access ticket, the ticket-based access control layer validates the service access ticket and grants run-time access to the protected resource. In some embodiment, the access is granted only after the access ticket access control check is satisfied and other access control checks are performed. At 9, the service application instance performs run-time transactions to obtain the resource requested by the client application instance from the protected resource. The service application instance interacts with the client application instance to provide the requested resource or data.

At 10, in the event the service access ticket does not match the validated access ticket or any validated access ticket in the list, the ticket-based access control layer denies the run-time access to the protected resource. The service application instance cannot access the protected resource even if other access control checks, such as the conventional token based authorization, are satisfied. In some embodiments, in the event that no service access ticket is provided by the service application instance, the ticket-based access control layer will also deny the run-time access to the protected resource, regardless of the result of other access control checks. That is, even if the conventional token based authorization is satisfied, access control to the protected resource will be denied if no access ticket is provided or no valid access ticket is provided.

The double injection of access ticket method of FIG. 9 can be implemented without modifications to either the client application or the service application. The ticket generator modules for injecting the access tickets are implemented inline with the API call flow and function to inject data packets rather than being a passive monitor. By using the double injection of access ticket, access control to the protected resource is secured as access control is granted only for a valid run-time session between the client application and the service application.

In some embodiments, the inline ticket generator module (or ticket injection module), either in the single front end injection embodiment (FIG. 8) or the double injection embodiment (FIG. 9), is implemented as physical or virtual network devices similar to the transaction monitor. In other words, the inline ticket generator module can be implemented as a software appliance executed on a processor, such as a self-contain virtual machine, with a virtual interface working as a virtual tap to the virtual network switch to which the service application is connected. In other embodiments, the inline ticket generator module can be ported to a hardware server appliance with a physical network interface tapping a physical network switch. The hardware server appliance performs the same functionality of the inline ticket generator module as the software appliance. The inline ticket generator module has two network interfaces replacing the original network link between two network switch ports. This allows the inline ticket generator module to function as an invisible network device in the middle of a network link, injecting network packets or modifying network packets traversing the network links. In some embodiments, the inline ticket generator module is a software that can run inside a virtual appliance with virtual network interfaces or inside a physical network appliance with actual physical network interfaces.

In particular, in embodiments of the present invention, the ticket generator module can be implemented in various forms that is inline with the API call flow. Besides being implemented as a virtual machine server or a hardware server, the ticket generator module can be a software module that is deployed as a "plug-in". In another example embodiment, the ticket generator module can also be implemented as plug-in to existing network proxies and as a message bus "bridge".

Security Policy Enforcement

The network security system and method described above is capable of providing secured access control by using run-time access tickets. Access control policy violations can be detected when the access ticket is absent or when the access ticket cannot be validated and access to the protected resource can be blocked in response to the detected policy violations. Alternately, conventional access control schemes, such as using static token, also operates to detect for policy violations and block access to the protected resource. In the event of a detected policy violation, the other network security system and method may implement policy enforcement action to protect against unauthorized access attempts.

In embodiments of the present invention, a network security system and method implements policy enforcement using API actions. For example, the API of an enterprise application is leveraged during run-time to block policy violation with no negative impact to the application itself or other users of the enterprise application. In some embodiments, the run-time transaction information between a client and server interaction is obtained and the same API used between the client application and service application is used to terminate an application-level action that is determined to be in violation of policy. Such action is taken at run-time, as if the application itself had taken the action. In some embodiments, the network security system uses enterprise social collaboration tools to interact with the user or with the system administrator in the event of detected security incident.

Figure 10:
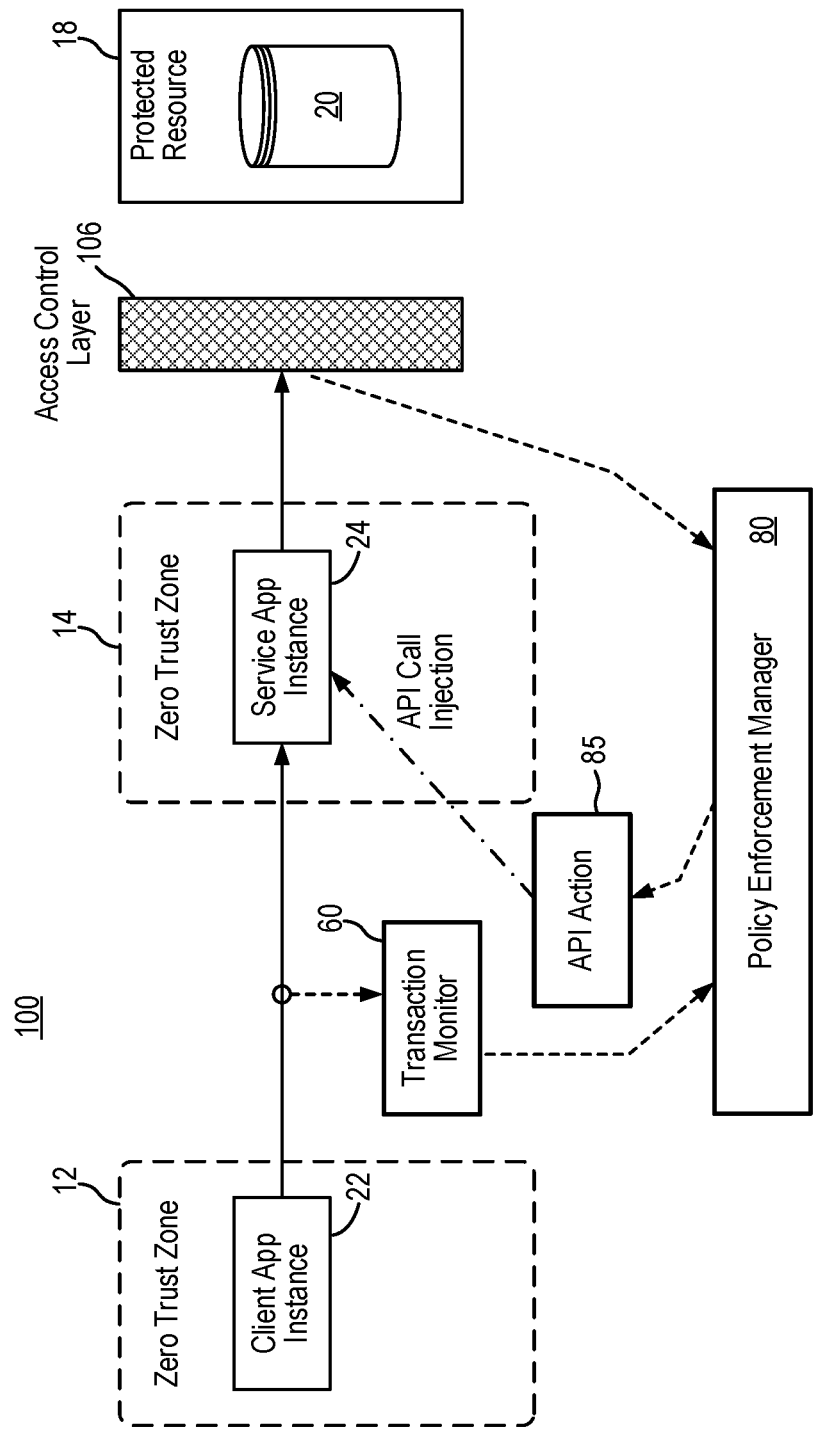
FIG. 10 illustrates an environment in which a network security system is implemented in embodiments of the present invention.

FIG. 10 illustrates an environment in which a network security system is implemented in embodiments of the present invention. Like elements in FIGS. 2 and 10 are given like reference numerals to simply the discussion. Referring to FIG. 10, in the network environment 100, an enterprise application provides a client application 22 interacting with a service application 24 to obtain data from a protected resource 18. An access control layer 106 is provided to implement access control rules. For example, the access control layer 106 can implement the conventional access control schemes, such as by using static tokens. Alternately, the access control layer 106 can additionally incorporate the ticket-based access control layer to implement access control based on dynamically generated access tickets, as described above.

The network security system includes a transaction monitor 60, a policy enforcement manager 80 and an API action module 85. The transaction monitor 60 monitors run-time transactions between the client application instance 22 and the service application instance 24. The transaction monitor 60 provides run-time application transaction information to the policy enforcement manager 80. In particular, the transaction monitor 60 provides run-time transaction information for the connection session associated with the policy violation. Because the transaction monitor 60 is capable of learning how the client application 22 interacts with the service application 24 at run-time, the policy enforcement manager 80 can use the run-time transaction information obtained to direct the policy enforcement action. More specifically, the policy enforcement manager 80 have information about the API that is being used between the client application and the service application and the policy enforcement manager 80 can direct the API action module 85 to issue an action using the same API.

More specifically, the access control layer 106 notifies the policy enforcement manager 80 of a policy violation. The policy enforcement manager 80 has received run-time transaction information from the transaction monitor 60 and therefore has learned information about the API that is being used in the connection session between the client application 22 and the service application 24. In response to the policy violation notification, the policy enforcement manager 80 instructs the API action module 85 to terminate the application-level action. For instance, the policy enforcement manager 80 instructs the API action module to use the same API that is used between the client application and the service application in the intended application to terminate the connection session at the application level. In other words, the policy enforcement manager 80 is able to instruct the API action module 85 to take counter-API action based on the API information learned from the transaction monitor 60. The API enforcement action is taken at run-time, as if the application itself had taken the action. In one embodiment, the API action module 85 issues an API call injection to the service application instance 24 to terminate the connection session.

The network security system of the present invention is capable of generating highly targeted API action by using the context information learned from the transaction monitor. In one embodiment, the API action module 85 issues an API call injection using the session ID of the connection session to call a "Logout" API action to invalidate a session if one of the operations performed using the same session ID was determined to be in violation of the security policy. In another embodiment, the API action module 85 issues an API call injection to restore a particular resource (e.g. S3 Object or a data file) and the prior version number learned by the transaction monitor 60 when the resource was falsely or unintentionally modified. In the case where the resource has been falsely or unintentionally modified, simply terminating the connection session may be too late as the damage to the resource might have occurred. The network security system of the present invention is able to use the API action module to gracefully restore resource data, thereby providing the most effective remediation. In another embodiment, the API action module 85 issues an API call injection to quarantine new resource data submitted that may be suspicious of containing malware.

In embodiments of the present invention, a "counter-API action" can be defined against any API action that violates a security policy, and the API action module can use the predefined counter-API action with parameters obtained by the transaction monitor to perform remediation functions that are both effective and user and application friendly. That is, the counter-API action can be taken without negatively impact application performance. For example, if a user inadvertently violates a policy accessing a protected resource, the counter-API action may be to logout the user rather than simply dropping the connection or invalidating the user's credential.

In embodiments of the present invention, the policy enforcement manager 80 is implemented as a software service executed on a processor. The policy enforcement manager 80 is configured to enforce security policies based on pre-configured anomaly or policy violation and policy actions. For example, a policy can be defined to deny a user or a group of user access to certain group of objects (e.g. a folder inside AWS S3 storage device). The policy enforcement manager 80 ensures such policy configuration is implemented in the access control layer 106. When a policy action is taken, the policy enforcement manager 80 is also responsible for maintaining a list of events and alerts to inform the security administrator and optionally, the end user.

Figure 11:
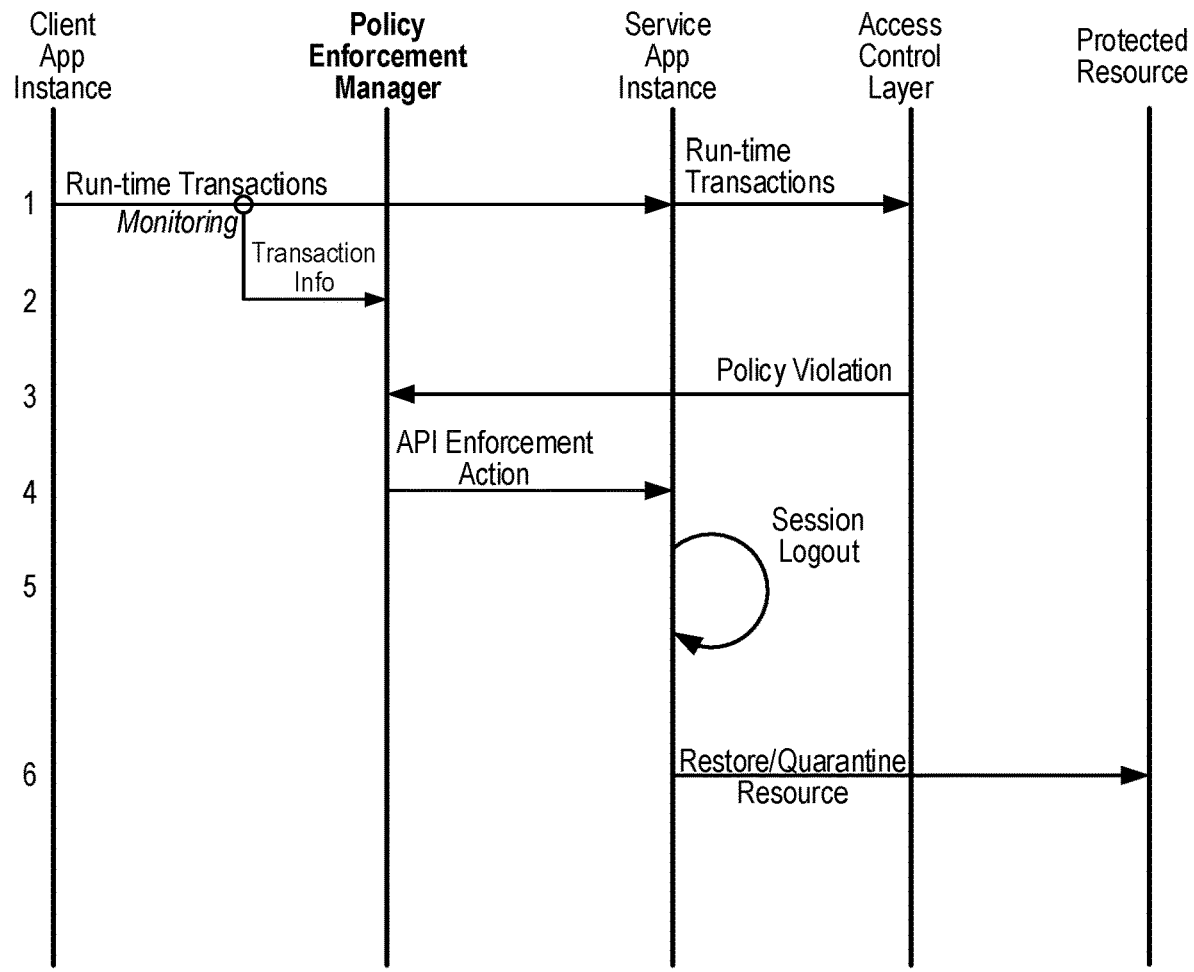
FIG. 11 illustrates a method for implement security policy enforcement in embodiments of the present invention.

FIG. 11 illustrates a method for implement security policy enforcement in embodiments of the present invention. The method in FIG. 11 can be implemented in the network security system of FIG. 10 in some embodiments. Referring to FIG. 11, at 1, the client application instance interacts with the service application in the course of application functions. For example, the client application instance can make API calls to the service application instance to request data from the protected resource. The service application instance performs application functions on behalf of the client application and requests data from the protected resource on behalf of the client application instance. The request from the service application instance is directed to the access control layer for access control checks.

At 2, the method monitors the run-time transaction information between the client application instance and the service application instance and provides the monitored transaction information to the policy enforcement manager. For example, the method may use the transaction monitor to capture the run-time transaction information. For example, the run-time transaction information can be the session information, such as the session ID.

At 3, the access control layer notifies or reports a policy violation to the policy enforcement manager. At 4, in response, the policy enforcement manager issues an API action as a counter measure. The API action is issued using the run-time transaction information learned from the monitoring. In one example, at 5, the API action is taken to logout the connection session. The session ID provided by the monitored transaction information is used to tailor the API action to the specific connection session that is in violation of the security policy. In another example, at 6, the API action is taken to restore falsely modified resources. The version number and related information is used to identify the resource that may have been falsely modified by an invalid action.

Active Client Notification

In some embodiments, in response to a security policy violation, the network security system implements notifications through API action to notify the user or the system administrator of the detected violations. Such notifications are useful to educate the end-user as policy violations are often inadvertent.

Figure 12:
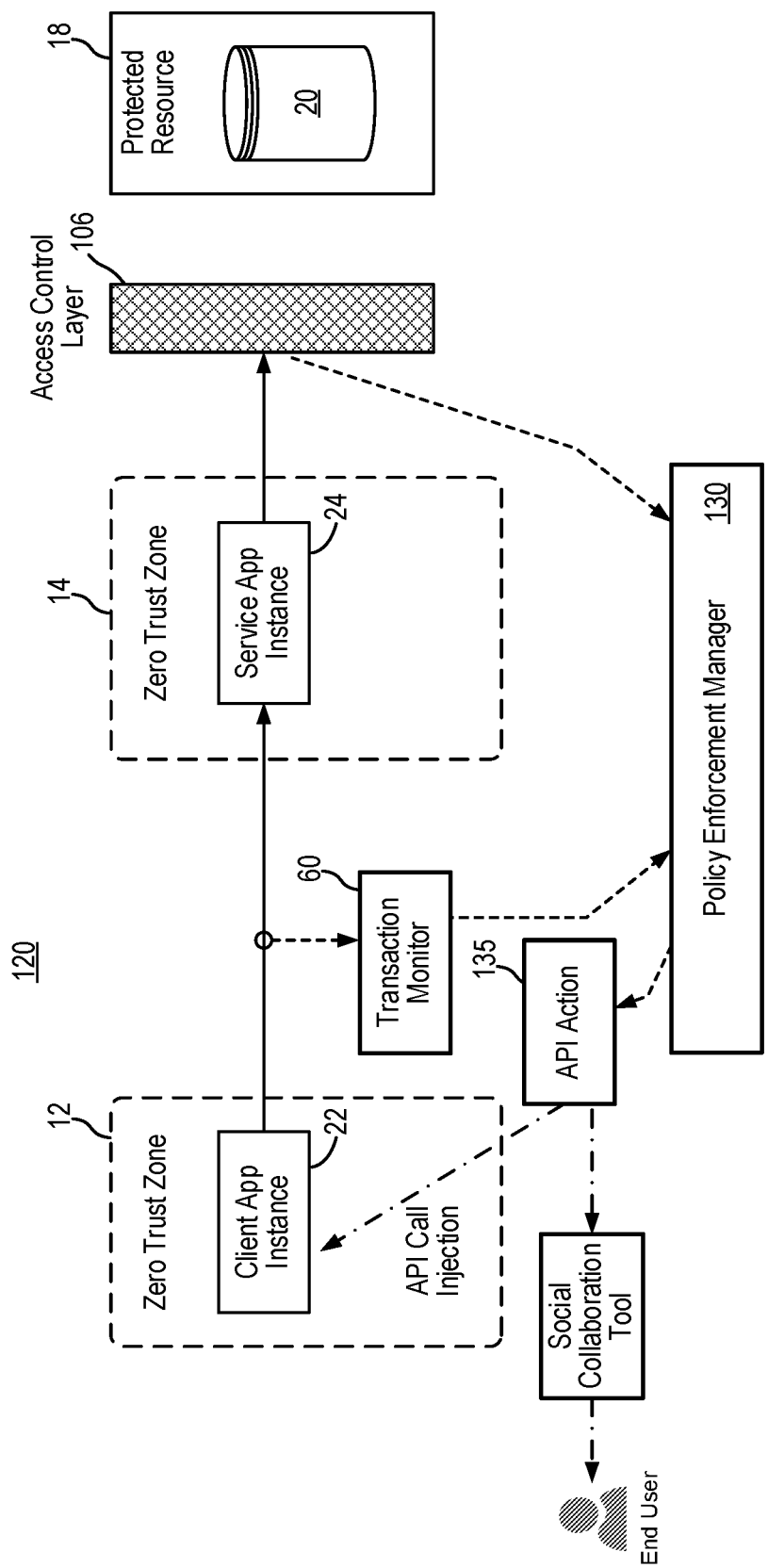
FIG. 12 illustrates an environment in which a network security system is implemented in embodiments of the present invention.

FIG. 12 illustrates an environment in which a network security system is implemented in embodiments of the present invention. Like elements in FIGS. 10 and 12 are given like reference numerals to simply the discussion. Referring to FIG. 12, in the network environment 120, an enterprise application provides a client application 22 interacting with a service application 24 to obtain data from a protected resource 18. An access control layer 106 is provided to implement access control rules. For example, the access control layer 106 can implement the conventional access control schemes, such as by using static tokens. Alternately, the access control layer 106 can additionally incorporate the ticket-based access control layer to implement access control based on dynamically generated access tickets, as described above.

The network security system includes a transaction monitor 60, a policy enforcement manager 130 and an API action module 135. The transaction monitor 60 monitors run-time transactions between the client application instance 22 and the service application instance 24. The transaction monitor 60 provides run-time application transaction information to the policy enforcement manager 130. In particular, the transaction monitor 60 provides run-time transaction information for the connection session associated with the policy violation. Because the transaction monitor 60 is capable of learning how the client application 22 interacts with the service application 24 at run-time, the policy enforcement manager 130 can use the run-time transaction information obtained to direct the active client notification action. More specifically, the policy enforcement manager 130 have information about the end user who is using the client application in the connection session.

More specifically, the access control layer 106 notifies the policy enforcement manager 130 of a policy violation. The policy enforcement manager 130 has received run-time transaction information from the transaction monitor 60 and therefore has learned information about the API that is being used in the connection session between the client application 22 and the service application 24. In response to the policy violation notification, the policy enforcement manager 130 instructs the API action module 135 to transmit a notification to the client application 22 to notify the user of the policy violation. Alternately, the policy enforcement manager 130 instructs the API action module 135 to transmit a notification through a third party platform to notify the end user of the client application of the policy violation. The third party platform used to transmit the notification can include an enterprise social collaboration tool or an enterprise message tool or other applications providing messaging capabilities to users of an enterprise.

Enterprise social collaboration tools have been widely adopted. Enterprise users have become familiar with social collaboration applications such as RingCentral Glip, Slack, Yammer, and HipChat. Compared to the conventional emails, enterprise social collaboration tools provide a more instantaneous and interactive experience. Thus, enterprise social collaboration tools are an ideal platform for providing security alerts. In embodiments of the present invention, the network security system uses enterprise social collaboration tools as a way to interact with end-users and/or enterprise administrators in an event of a security incident. For enterprise security organizations, end-user notification has a major advantage of reducing false positive security alerts, since the security issue is first raised with the end user and if the security violation was inadvertent, the violations can be resolved without the security organization being involved.

The use of social collaboration tools for security alerts is illustrative only and not intended to be limiting. In other embodiments, the network security system uses other notification tools and applications. For example, in one embodiment, the network security can invoke an enterprise application, such as an enterprise employee messaging application, for transmitting notifications of a security incident.

Figure 13:
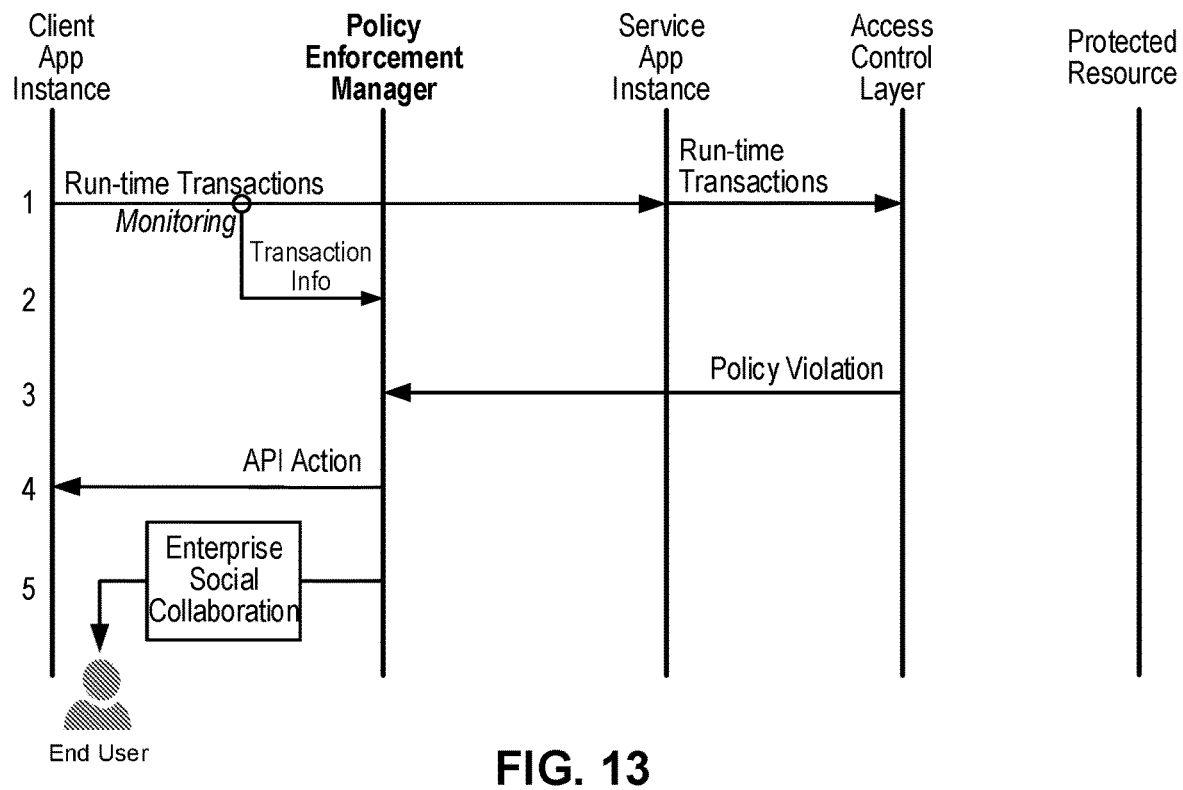
FIG. 13 illustrates a method for implement security policy enforcement in embodiments of the present invention.

FIG. 13 illustrates a method for implement security policy enforcement in embodiments of the present invention. The method in FIG. 13 can be implemented in the network security system of FIG. 12 in some embodiments. Referring to FIG. 13, at 1, the client application instance interacts with the service application in the course of application functions. For example, the client application instance can make API calls to the service application instance to request data from the protected resource. The service application instance performs application functions on behalf of the client application and requests data from the protected resource on behalf of the client application instance. The request from the service application instance is directed to the access control layer for access control checks.

At 2, the method monitors the run-time transaction information between the client application instance and the service application instance and provides the monitored transaction information to the policy enforcement manager.

For example, the method may use the transaction monitor to capture the run-time transaction information. For example, the run-time transaction information can be the session information, such as the user ID.

At 3, the access control layer notifies or reports a policy violation to the policy enforcement manager. At 4, in response, the policy enforcement manager issues an API action as a counter measure. The API action is issued using the run-time transaction information learned from the monitoring. In one embodiment, the API action is taken to notify the client application instance of the policy violation. In another embodiment, at 5, the API action is taken to notify the end user of the policy violation through the use of an enterprise social collaboration tool. Examples of enterprise social collaboration tools include RingCentral Glip, Slack, Yammer, and HipChat.

Figure 14:
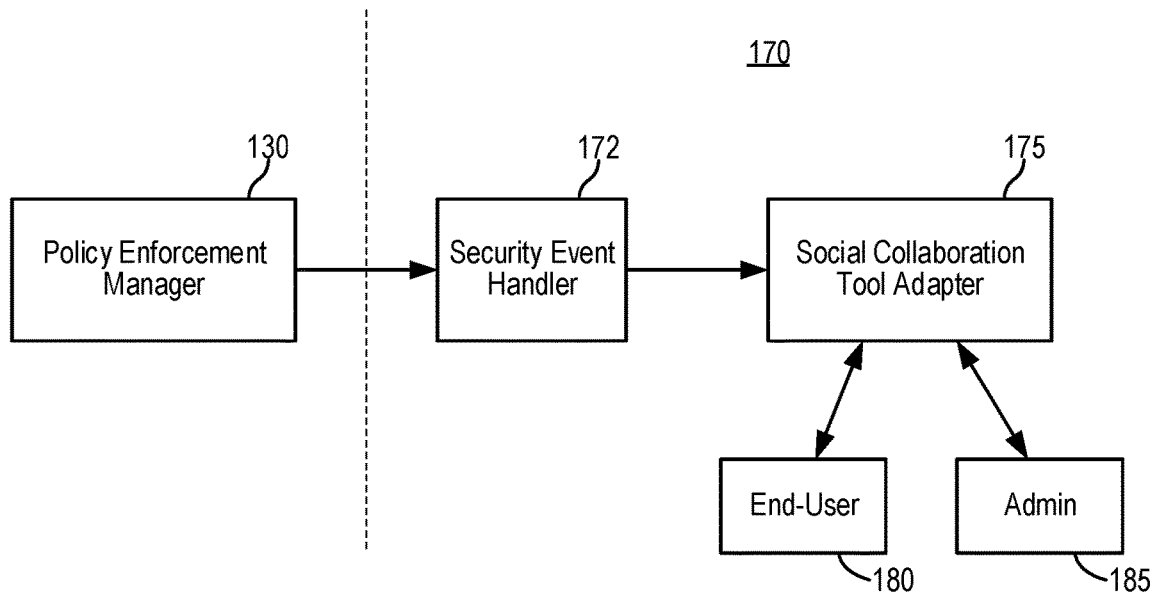
FIG. 14 is a block diagram illustrating a notification module using an enterprise social collaboration tool in some embodiments.

In some embodiments, notification through an enterprise social collaboration tool is implemented as follows. FIG. 14 is a block diagram illustrating a notification module using an enterprise social collaboration tool in some embodiments. In some embodiments, the notification module is a software service executed on a processor. Referring to FIG. 14, the notification module 170 includes a social collaboration tool adapter 175. The social collaboration tool adapter 175 uses the API supported by the subject social collaboration tool that can notify the end-user 180 and/or the system administrator 185 and can take actions based on the user/administrator response. The notification module 170 further includes a security event handler 172. The security event handler 172 can be implemented as an automatic messaging agent. For example, a messenger app "chat bot" can be used. The security event handler 172 uses the social collaboration tool adapter 175 to interact with the end-user 180 or the system administrator 185.

In operation, in response to a security policy violation, the policy enforcement manager 130 raises a security event with associated user and user-device information. The policy enforcement manager 130 uses the security event handler 172 to launch a handler agent. In response to the security event being raised, the security event hander 172 launches a handler agent to handle the incident. The handler agent executes a pre-configured rule or policy which is to take action to inform the end-user 180 and/or the system administrator 185. The handler agent loads the social collaboration tool adapter 175 with the requisite user and device information. The social collaboration tool adapter 175 is therefore able to issue a security alert notification to the end-user 180 or the system administrator 185.

Upon receiving the security alert raised by the adapter 175, the end-user and/or system administrator has the option to respond. The response is handled by the handler agent and can include remediation actions provided by the end-user or the system administrator. The handler agent then provides feedback to the network security system. One of the responses can simply be to acknowledge the incident. A more sophisticated response may inform the network security system about future actions to take.

Figure 15:
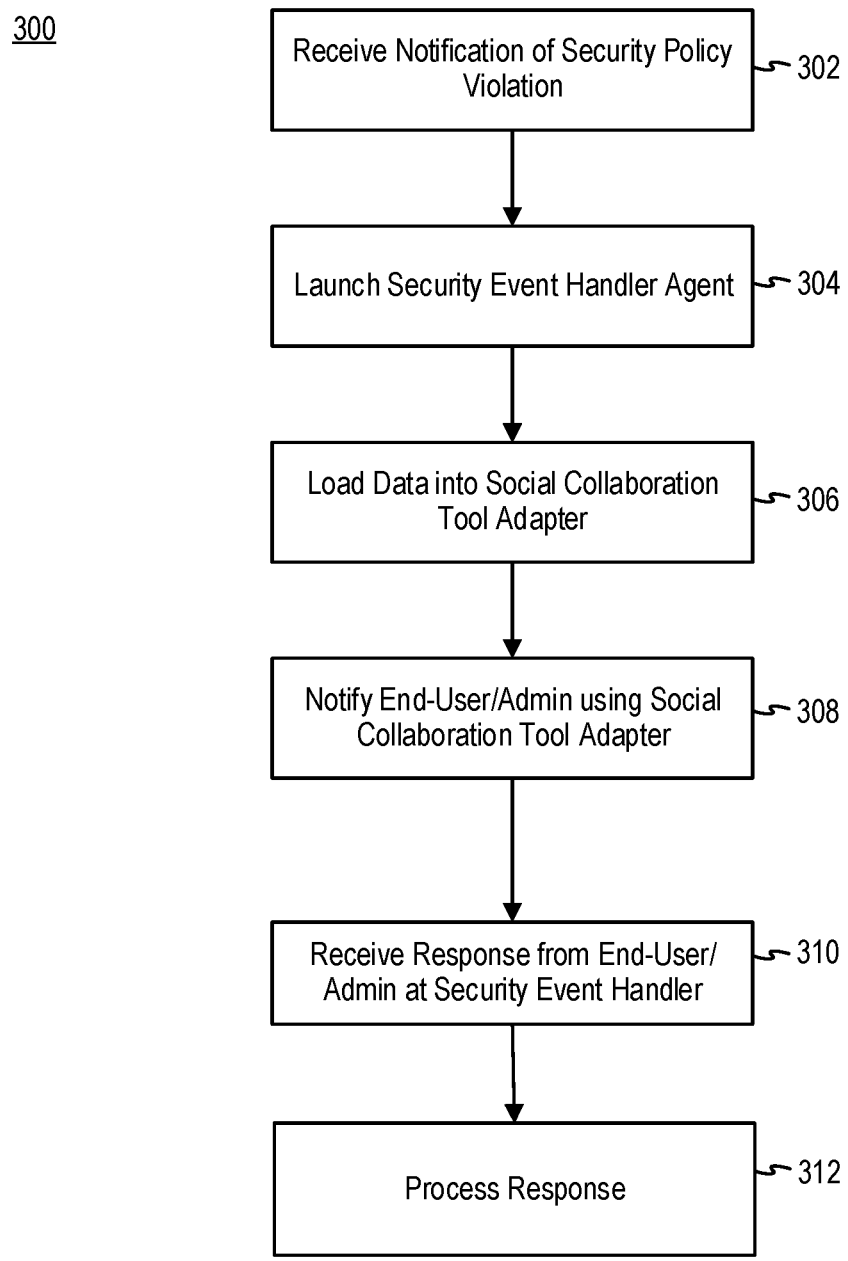
FIG. 15 is a flowchart illustrating a network security incident notification method in some embodiments.

FIG. 15 is a flowchart illustrating a network security incident notification method in some embodiments. The method of FIG. 15 can be implemented using the notification module of FIG. 14 in some embodiments. Referring to FIG. 15, a method 300 receives a notification of a security policy violation or a security incident (302). The method 300 launches a security event handler agent (304). The method 300 then loads data into a social collaboration tool adapter (306). The data includes user and user device information associated with the security incident. The method 300 then notifies the end-user and/or the system administrator through the social collaboration tool using the adapter (308). In some embodiments, the method 300 may receive a response from the end-user or the system administrator (310). The response is provided to the security event handler agent. The method 300 may then process the response (312).

It is instructive to note that the policy enforcement methods and the active client notification methods described above can be used in conjunction with the access ticket based network security systems and methods described above to provide dynamic access control as well as effective policy enforcement actions.

Deception Honeypot Service

In some embodiments, in response to a security incident, the policy enforcement manager creates a deception honeypot and redirects the suspicious connection session to the deception honeypot. A deception honeypot is a service that appears to implement the same service application instance function but without actually performing the tasks. Instead, the deception honeypot is designed to "trap" rouge attackers, making the rouge attackers believe that they are interacting with the real service application. Using the deception honeypot allows the security administrator time to react and trace the attackers.

Figure 16:
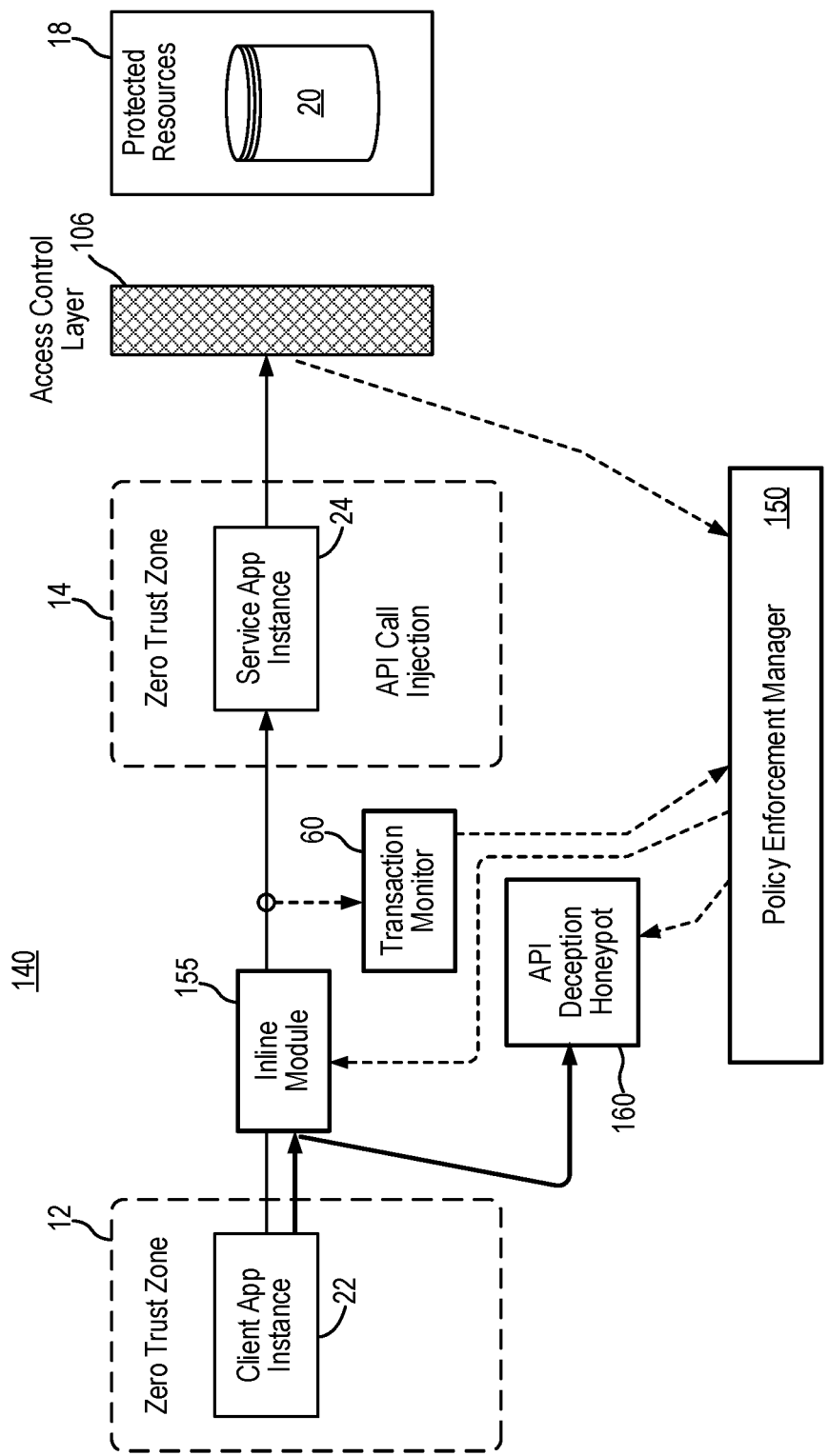
FIG. 16 illustrates an environment in which a network security system is implemented in embodiments of the present invention.

FIG. 16 illustrates an environment in which a network security system is implemented in embodiments of the present invention. Like elements in FIGS. 12 and 16 are given like reference numerals to simply the discussion. Referring to FIG. 16, in the network environment 140, an enterprise application provides a client application 22 interacting with a service application 24 to obtain data from a protected resource 18. An access control layer 106 is provided to implement access control rules. For example, the access control layer 106 can implement the conventional access control schemes, such as by using static tokens. Alternately, the access control layer 106 can additionally incorporate the ticket-based access control layer to implement access control based on dynamically generated access tickets, as described above.

The network security system includes a transaction monitor 60, a policy enforcement manager 150, an inline module 155 and an API deception honeypot service 160. The transaction monitor 60 provides run-time application transaction information to the policy enforcement manager 150. Because the transaction monitor 60 is capable of learning how the client application 22 interacts with the service application 24 at run-time, the policy enforcement manager 150 can use the run-time transaction information obtained to launch the deception honeypot service. More specifically, the policy enforcement manager 150 have information about the API that is being used between the client application and the service application and the policy enforcement manager 150 can create a deception honeypot 160 using the same API. The inline module 155 is deployed in the communication path between the client application instance 22 and the service application instance 24 to redirect connection sessions in which security policy violations have occurred to the deception honeypot service 160.

More specifically, the access control layer 106 notifies the policy enforcement manager 150 of a policy violation. The transaction monitor 60 monitors run-time transactions between the client application instance 22 and the service application instance 24. The transaction monitor 60 provides run-time application transaction information to the policy enforcement manager 150. In particular, the transaction monitor 60 provides run-time transaction information for the connection session associated with the policy violation.

Because the transaction monitor 60 is capable of learning how the client application 22 interacts with the service application 24 at run-time, the policy enforcement manager 150 can use the run-time transaction information obtained to generate the deception honeypot service 160. Furthermore, the policy enforcement manager 150 instructs the inline module 155 to redirect network traffic associated with the suspected connection session to the deception honeypot service 160. In this manner, the potential bad actors are directed away from the normal application service.

Figure 17:
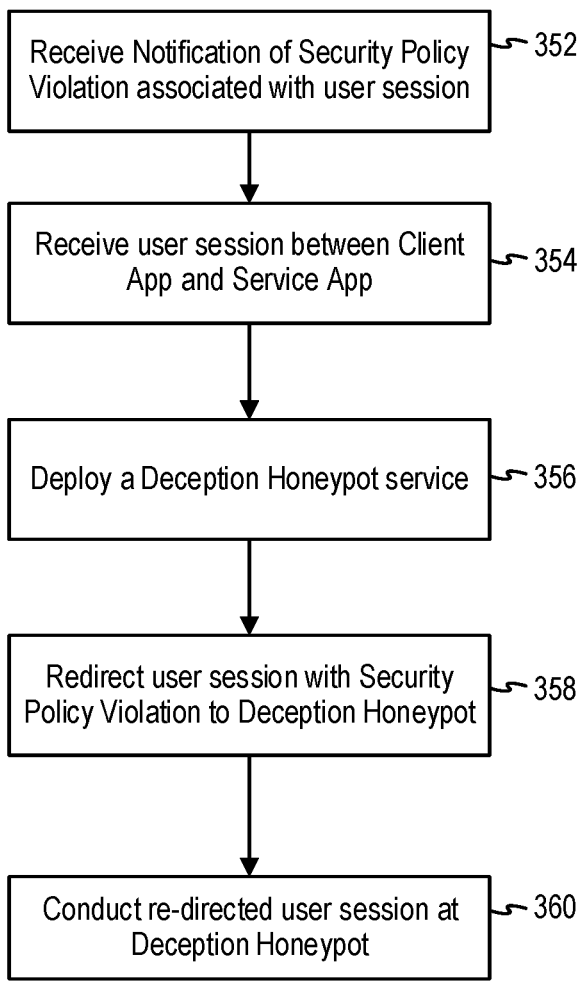
FIG. 17 is a flowchart illustrating a network security method using a deception honeypot service in some embodiments.

FIG. 17 is a flowchart illustrating a network security method using a deception honeypot service in some embodiments. The method of FIG. 17 can be implemented using the network security system of FIG. 16 in some embodiments. Referring to FIG. 17, a method 350 receives a notification of a security policy violation or a security incident (352). The method 350 receives run-time transaction information for the connection session associated with the security incident (354). The method 350 launches a deception honeypot service using the run-time transaction information for the suspicious connection session (356). The method 350 then redirects network traffic associated with the suspected connection session to the deception honeypot service (358). The method 350 then conducts the redirected connection session at the deception honeypot service (360).

Various embodiments of the present invention may be implemented in or involve one or more computer systems. The computer system is not intended to suggest any limitation as to scope of use or functionality of described embodiments. The computer system includes at least one processing unit and memory. The processing unit executes computer-executable instructions and may be a hardware processor or a virtual processor. The computer system may include a multi-processing system which includes multiple processing units for executing computer-executable instructions to increase processing power. The memory may be volatile memory (e.g., registers, cache, random access memory (RAM)), non-volatile memory (e.g., read only memory (ROM), electrically erasable programmable read only memory (EEPROM), flash memory, etc.), or combination thereof. In an embodiment of the present invention, the memory may store software for implementing various embodiments of the present invention.

Further, the computer system may include components such as storage, one or more input computing devices, one or more output computing devices, and one or more communication connections. The storage may be removable or non-removable, and includes magnetic disks, magnetic tapes or cassettes, compact disc-read only memories (CD-ROMs), compact disc rewritables (CD-RWs), digital video discs (DVDs), or any other medium which may be used to store information, and which may be accessed within the computer system. In various embodiments of the present invention, the storage may store instructions for the software implementing various embodiments of the present invention. The input computing device(s) may be a touch input computing device such as a keyboard, mouse, pen, trackball, touch screen, or game controller, a voice input computing device, a scanning computing device, a digital camera, or another computing device that provides input to the computer system. The output computing device(s) may be a display, printer, speaker, or another computing device that provides output from the computer system. The communication connection(s) enable communication over a communication medium to another computer system. The communication medium conveys information such as computer executable instructions, audio or video information, or other data in a modulated data signal. A modulated data signal is a signal that has one or more of its characteristics set or changed in such a manner as to encode information in the signal. By way of example, and not limitation, communication media includes wired or wireless techniques implemented with an electrical, optical, RF, infrared, acoustic, or other carrier. In addition, an interconnection mechanism such as a bus, controller, or network may interconnect the various components of the computer system. In various embodiments of the present invention, operating system software may provide an operating environment for software executing in the computer system, and may coordinate activities of the components of the computer system.

In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

Various embodiments of the present invention may be described in the general context of computer-readable media. Computer-readable media are any available media that may be accessed within a computer system. By way of example, and not limitation, within the computer system, computer-readable media include memory, storage, communication media, and combinations thereof.

Having described and illustrated the principles of the invention with reference to described embodiments, it will be recognized that the described embodiments may be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein. Elements of the described embodiments shown in software may be implemented in hardware and vice versa.

A detailed description of one or more embodiments of the invention is provided above along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

The above detailed descriptions are provided to illustrate specific embodiments of the present invention and are not intended to be limiting. Numerous modifications and variations within the scope of the present invention are possible. The present invention is defined by the appended claims.

What is claimed is:

1. A computer-implemented method for providing access control to a protected resource using run-time transaction data between a client application and a service application in a zero trust environment, the computer-implemented method comprising:

deploying a ticket-based access control layer providing an access control function to the protected resource;

monitoring the run-time transaction information between the client application and the service application, wherein the run-time information is generated while the client application engages in communication with the service application to request data from the protected resource;

receiving, at an access control manager, the run-time transaction information, wherein the run-time transaction information comprises information that is available only during the communication with the service application and is unique to the communication with the service application;

generating, at the access control manager, a validated access ticket using at least in part the run-time transaction information;

providing the validated access ticket to the ticket-based access control layer; and applying, at the ticket-based access control layer, access control rules using the validated access ticket to grant or deny access to the protected resource in response to a request for data from the service application.

2. The computer-implemented method of claim 1, further comprising:

at the ticket-based access control layer, denying access to the protected resource in response to an access ticket not being provided by the service application to the ticket-based access control layer to be validated by the validated access ticket.

3. The computer-implemented method of claim 1, further comprising:

receiving, at the ticket-based access control layer, a service access ticket from the service application;

at the ticket-based access control layer, granting access to the protected resource in response to the service access ticket being validated using the validated access ticket; and at the ticket-based access control layer, denying access to the protected resource in response to the service access ticket not being validated using the validated access ticket.

4. The computer-implemented method of claim 1, further comprising:

selecting, at the access control manager, a ticket generation method;

providing the selected ticket generation method to the service application;

generating, at the access control manager, the validated access ticket using the ticket generation method and using at least in part the run-time transaction information;

receiving, at the ticket-based access control layer, a service access ticket generated at the service application using the selected ticket generating method;

applying, at the ticket-based access control layer, the access control rules to validate the service access ticket using the validated access ticket;

at the ticket-based access control layer, granting access to the protected resource in response to the service access ticket being validated using the validated access ticket; and at the ticket-based access control layer, denying access to the protected resource in response to the service access ticket not being validated using the validated access ticket.

5. The computer-implemented method of claim 4, wherein electing the ticket generation method comprises:

electing, at the access control manager, a method to generate the access ticket using at least in part the run-time transaction information.

6. The computer-implemented method of claim 1, further comprising:

receiving, at the access control manager, a request from the client application requesting a client access ticket;

generating, at the access control manager, the client access ticket and providing the client access ticket to the client application;

monitoring the run-time transaction information for the client access ticket transmitted from the client application to the service application;

receiving, at the access control manager, the run-time transaction information comprising the client access ticket;

generating, at the access control manager, the validated access ticket comprising validating the client access ticket and providing the client access ticket as the validated access ticket;

receiving, at the ticket-based access control layer, a service access ticket from the service application;

applying, at the ticket-based access control layer, the access control rules to validate the service access ticket using the validated access ticket;

at the ticket-based access control layer, granting access to the protected resource in response to the service access ticket being validated using the validated access ticket; and at the ticket-based access control layer, denying access to the protected resource in response to the service access ticket not being validated using the validated access ticket.

7. The computer-implemented method of claim 6, wherein the service access ticket comprises the client access ticket transmitted to the service application from the client application, the service application forwarding the client access ticket to the ticket-based access control layer as the service access ticket.

8. The computer-implemented method of claim 1, further comprising:

receiving, at the access control manager, a request from the service application requesting a service access ticket and including a first session token;

receiving, at the access control manager, the run-time transaction information including a second session token identifying the connection session between the client application and the service application;

validating, at the access control manager, the first session token using the second session token;

in response to the first session token being validated, generating, at the access control manager, the service access ticket and providing the service access ticket to the service application;

generating, at the access control manager, the validated access ticket comprising providing the service access ticket as the validated access ticket;

receiving, at the ticket-based access control layer, the service access ticket from the service application;

applying, at the ticket-based access control layer, the
access control rules to validate the service access ticket
using the validated access ticket;
at the ticket-based access control layer, granting access to
the protected resource in response to the service access
ticket being validated using the validated access ticket;
and
at the ticket-based access control layer, denying access to
the protected resource in response to the service access
ticket not being validated using the validated access
ticket.

9. The computer-implemented method of claim 1, further comprising:
deploying a ticket injection module in a communication
path between the client application and the service
application;
at the ticket injection module, injecting an access ticket in
the run-time transaction between the client application
and the service application using the run-time transaction information;
receiving, at the access control manager, the run-time
transaction information from the monitoring comprises
receiving the injected access ticket in the monitored
run-time transaction information;
generating, at the access control manager, the validated
access ticket comprising validating the injected access
ticket using run-time transaction information and providing the injected access ticket as the validated access
ticket;
receiving, at the ticket-based access control layer, a service access ticket from the service application;
applying, at the ticket-based access control layer, the
access control rules to validate the service access ticket
using the validated access ticket;
at the ticket-based access control layer, granting access to
the protected resource in response to the service access
ticket being validated using the validated access ticket;
and
at the ticket-based access control layer, denying access to
the protected resource in response to the service access
ticket not being validated using the validated access
ticket.

10. The computer-implemented method of claim 9, wherein the service access ticket comprises the injected access ticket transmitted to the service application on the communication path, the service application forwarding the injected access ticket to the ticket-based access control layer as the service access ticket.

11. The computer-implemented method of claim 9, wherein the service access ticket comprises the validated access ticket which is related to the injected access ticket generated by the first ticket injection module.

12. The computer-implemented method of claim 1, further comprising:
deploying a first ticket injection module in a first communication path between the client application and the
service application;
at the first ticket injection module, injecting an access
ticket in the run-time transaction between the client
application and the service application using the run-time transaction information;
receiving, at the access control manager, the run-time
transaction information from the monitoring comprises
receiving the injected access ticket in the monitored
run-time transaction information;
generating, at the access control manager, the validated
access ticket comprising validating the injected access
ticket using run-time transaction information and providing the injected access ticket as the validated access
ticket;
deploying a second ticket injection module in a second
communication path between the service application
and the ticket-based access control layer;
at the second ticket injection module, injecting a service
access ticket provided by the access control manager in
the run-time transaction between the service application and the ticket-based access control layer;
receiving, at the ticket-based access control layer, the
service access ticket from the service application;
applying, at the ticket-based access control layer, the
access control rules to validate the service access ticket
using the validated access ticket;
at the ticket-based access control layer, granting access to
the protected resource in response to the service access
ticket being validated using the validated access ticket;
and
at the ticket-based access control layer, denying access to
the protected resource in response to the service access
ticket not being validated using the validated access
ticket.

13. The computer-implemented method of claim 1, further comprising:
in response to the ticket-based access control layer denying access to the protected resource by the service
application, generating, at a policy enforcement manager, an application programming interface request to
instruct the service application to logout of the connection session.

14. The computer-implemented method of claim 1, further comprising:
in response to the ticket-based access control layer denying access to the protected resource by the service
application, generating, at a policy enforcement manager, an application programming interface request to
instruct the service application to restore deleted
resources or quarantine new resources stored on the
protected resource.

15. The computer-implemented method of claim 1, further comprising:
in response to the ticket-based access control layer denying access to the protected resource by the service
application, generating, at a policy enforcement manager, a notification event on a social collaboration tool
or a messaging tool to notify the client application of
the denial of access.

16. The computer-implemented method of claim 1, further comprising:
providing an inline security module in the communication
path between the client application and the service
application;
in response to the ticket-based access control layer denying access to the protected resource by the service
application, identifying, at a policy enforcement manager, the connection session associated with the access
denial;
providing the identified connection session to the inline
security module;
detecting at the inline security module run-time transaction associated with the identified connection session;
redirecting the run-time transaction to a deception honeypot module, the deception honeypot module providing decoyed run-time transaction to the identified connection session.

\* \* \* \* \*